United States Patent
Ueda et al.

[11] Patent Number: 6,008,812
[45] Date of Patent: *Dec. 28, 1999

[54] IMAGE OUTPUT CHARACTERISTIC SETTING DEVICE

[75] Inventors: Masashi Ueda; Ryohei Komiya, both of Nagoya, Japan

[73] Assignee: Brothers Kogyo Kabushiki Kaisha, Nagoya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/825,917

[22] Filed: Apr. 2, 1997

[30] Foreign Application Priority Data

Apr. 3, 1996 [JP] Japan .................................. 8-081634

[51] Int. Cl.$^6$ ........................................ G06T 9/40
[52] U.S. Cl. .................... 345/418; 345/419; 345/522; 345/357; 345/353
[58] Field of Search .................... 345/522, 357, 345/353, 352, 418, 116; 395/101, 109, 106

[56] References Cited

U.S. PATENT DOCUMENTS

| | | | |
|---|---|---|---|
| 4,958,217 | 9/1990 | Kimura et al. . | |
| 5,020,004 | 5/1991 | Agarashi | 395/109 |
| 5,481,741 | 1/1996 | Mckaskle et al. | 345/522 |
| 5,644,740 | 7/1997 | Kiuchi | 345/357 |
| 5,704,021 | 12/1997 | Smith et al. | 345/409 |
| 5,784,059 | 7/1998 | Morimoto et al. | 345/353 |

FOREIGN PATENT DOCUMENTS

| | | |
|---|---|---|
| 0 665 676 | 2/1995 | European Pat. Off. . |
| 7-193710 | 7/1995 | Japan . |

*Primary Examiner*—Mark R. Powell
*Assistant Examiner*—Kimbinh T. Nguyen
*Attorney, Agent, or Firm*—Oliff & Berridge, PLC

[57] ABSTRACT

Before printing, the CPU 12 prescans image data stored in the working memory 14 to determine a location and an image type of each image portion in S3100. The CPU 12 creates image type data for all the image portions (partial images and their constituent image elements), and stores the image type data in the working memory 14. Image type data represent regions of the image portions, a hierarchical relationship between the respective image portions, and image types of the image portions. After manipulating the mouse input device to change a printing characteristic in S3500, the operator selects, in accordance with the hierarchical structure, an image type whose printing characteristic is desired to be changed in S3600. One or more image portions of the selected image type are displayed on an image layout screen. Image data for the displayed image portions is searched from the image type data. The operator selects and designates a printing characteristic desired to be set for the displayed image portions. As a result, in S3700, the operator's designated printing characteristic is set as a common characteristic onto image data of the displayed image portions.

22 Claims, 18 Drawing Sheets

FIG.20

IMAGE TYPE MEMORY REGION

M2

| NO | FORMAT TYPE | REGIONAL DATA REGION | IMAGE TYPE | ATTRIBUTE |
|---|---|---|---|---|
| 0 | 0 | (Xs0,Ys0),(Xe0,Ye0) | PHOTOGRAPH/PORTRAIT | NONE |
| .... | .... | .... | .... | .... |
| m | 2 | Line,Ystart,(Xs0,Xe0),(Xs1,Xe1),(Xs2,Xe2),........,(Xsn,Xe) | PHOTOGRAPH/PORTRAIT/BACKGROUND/GREEN | 0 |
| m+1 | 2 | Line,Ystart,(Xs0,Xe0),(Xs1,Xe1),(Xs2,Xe2),........,(Xsn,Xen) | PHOTOGRAPH/PORTRAIT/BACKGROUND/TRUNK | 0 |
| .... | .... | .... | .... | .... |

52
52m
52h

FIG. 21
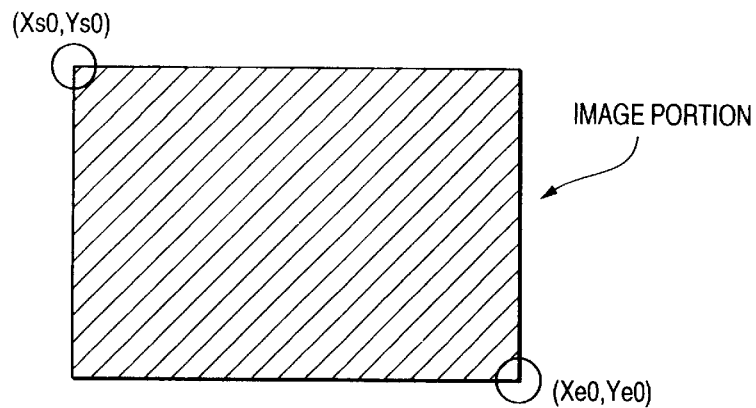
FIG. 22
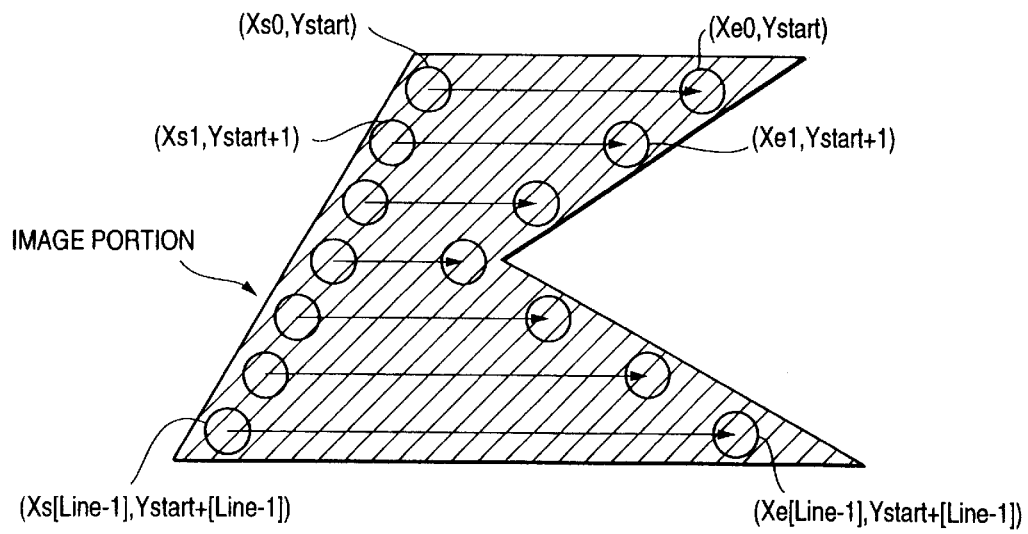
FIG. 23
| IMAGE TYPE | PRINTING CHARACTERISTICS | |
|---|---|---|
| | COLOR ADJUSTMENT | SCREEN ADJUSTMENT |
| PHOTOGRAPH | NORMAL | FINE |
| PHOTOGRAPH/ PORTRAIT | ENHANCED (SKIN/TANNED) | FINE |
| ⋮ | ⋮ | ⋮ |
M1

FIG.24

| IMAGE TYPE | REGIONAL DATA | PRINTING CHARACTERISTICS ||
| --- | --- | --- | --- |
| | | COLOR ADJUSTMENT | SCREEN ADJUSTMENT |
| PHOTOGRAPH | | NORMAL | FINE |
| PHOTOGRAPH/ PORTRAIT | | ENHANCED (SKIN/TANNED) | FINE |
| .... | | .... | .... |

M3

# 6,008,812

IMAGE OUTPUT CHARACTERISTIC SETTING DEVICE

BACKGROUND OF THE INVENTION

1. Field of the Invention

The present invention relates to an image output characteristic setting device for setting image output characteristics onto an image which is constructed from different types of image portions.

2. Description of Related Art

Recently, an advanced desk top publishing (hereinafter referred to as "DTP") system has been proposed. The DTP can combine, into a composite image, different types of images such as photographic images, business graphic images such as graphs and figures, and text images.

According to the DTP, however, the entire composite image is printed with the same single printing characteristic. Accordingly, the DTP suffers from the following problems.

An operator sometimes desires to adjust the color printing characteristic to ensure satisfactory color printing of the photographic image portions. In this case, however, the business graphics image portions in the same document will often appear dull in the resultant color print. Similarly, the operator sometimes desires to adjust the color printing characteristic to ensurely satisfactorily print the vivid colors of the business graphic image portions. In this case, the photographic image portions will lose its lifelike appearance in the resultant color print.

In order to solve the above-described problems, European patent application publication No. 0 665 676 A2 has proposed to set different printing characteristics to the respective types of image portions to obtain the best result available. The best printing characteristics for the respective types of image portions, such as photographic image portions, text image portions, and illustration image portions, are set manually or automatically by a computer process.

SUMMARY OF THE INVENTION

There are various types of photographic images. The various types of photographic images include: photographs of landscapes, photographs of portraits, and photographs of still lives. The photographic portraits include various types of portraits, such as portraits expressing different situations and figures of different ages and genders. When the same printing characteristic is set to the different types of photographic images, when printed, the photographic images will appear monotonous. It becomes impossible to obtain high guality printed images.

Similarly, there are various types of text images. The various types of text images includes texts of various languages, such as, English and Japanese; texts with gradation; texts without gradations: and texts constructed from letters of different sizes and of different font types. Similarly, there are various types of graphic images. The various types of graphic images include: graphs; computer graphics; graphic images with tones; graphic images without tones; and graphic images with colors of different numbers. Therefore, it is necessary to adjust printing characteristics dependent on the great variety of image types in order to get satisfactory print images.

However, it is extremely troublesome and time consuming to select printing characteristics best for each of the plurality of image types.

The same problem also arises when a single display characteristic is set for displaying various types of images on the CRT display and the like.

It is therefore an objective of the present invention to provide an improved and simplified process for setting image output or appearance characteristics onto image data constructed from various image types.

In order to attain these and other objects, the present invention provides an image. output characteristic setting device for setting an image output characteristic, the device comprising: image data storage means for storing a set of entire image data indicative of an entire image, the entire image including at least one image portion, the set of entire image data including at least one set of image data indicative of the at least one image portion; image type data storage means for storing data of a plurality of image types which are classified in a hierarchical structure; image type selection means for selecting a desired image type from the hierarchical structure; image data selecting means for selecting, from the image data storage means, at least one set of image data indicative of at least one image portion of the selected image type; and common image output characteristic setting means for setting an image output characteristic as a common image output characteristic for all the selected sets of image data.

The image output characteristic setting device may further comprise: input means capable of inputting an instruction to select the desired image type; and control means for controlling the image type selection means to select the desired image type in accordance with the inputted image type selecting instruction, and for controlling the image data selecting means to select the at least one image data set of the selected image type. The input means may be further capable of inputting an instruction to set a desired image output characteristic for the selected image type. The device may further comprise control means for controlling the common image output characteristic setting means to set the desired image output characteristic to all the selected at least one set of image data in accordance with the inputted image output characteristic setting instruction. The common image output characteristic setting means may set the common image output characteristic not only onto all the selected sets of image data but also onto at least one set of image data indicative of at least one image portion of an image type which is of a narrower category than the selected image type.

BRIEF DESCRIPTION OF THE DRAWINGS

The above and other objects, features and advantages of the invention will become more apparent from reading the following description of the preferred embodiment taken in connection with the accompanying drawings in which:

FIGS. 17(a) through 17(f) show a display shift diagram how the image type listing portion is shifted according to a category shift mode, wherein FIG. 17(a) shows the image type listing portion at the initial stage, FIG. 17(b) shows the image type listing portion when the present image type is "photograph", FIG. 17(c) shows the image type listing portion when the present image type is "photograph/portrait", FIG. 17(d) shows the image type listing portion when the present image type is "graphics", FIG. 17(e) shows the image type listing portion when the present image type is "text", and FIG. 17(f) shows the image type listing portion when the present image type is "photograph/still life";

FIGS. 18(a)–18(h) show a display shift diagram how an image layout screen box is shifted according to a category shift mode, wherein FIG. 18(a) shows the image layout screen box at the initial stage, FIG. 18(b) shows the image layout screen box when the present image type is "photograph", FIG. 18(c) shows the image layout screen box when the present image type is "photograph/portrait", FIG. 18(d) shows the image layout screen box when the present image type is "photograph/portrait/entire figure", FIG. 18(e) shows the image layout screen box when the present image type is "photograph/portrait/background", FIG. 18(f) shows the image layout screen box when the present image type is "text", FIG. 18(g) shows the image layout screen box when the present image type is "graphics", and FIG. 18(h) shows the image layout screen box when the present image type is "photograph/still life";

FIGS. 19(a)–19(e) show a display shift diagram, how the printing characteristic item listing portion is shifted as the operator selects a printing characteristic desired to be adjusted, wherein FIG. 19(a) shows the printing characteristic item listing portion at the initial stage, FIG. 19(b) shows the printing characteristic item listing portion displayed when the operator has selected "color adjustment", FIG. 19(c) shows the printing characteristic item listing portion displayed when the operator has selected "screen adjustment", FIG. 19(d) shows the printing characteristic item listing portion displayed when the operator has selected "enhanced color adjustment" after the operator has selected an image type "photograph/portrait/skin", and FIG. 19(e) shows the printing characteristic item listing portion displayed when the operator has selected "enhanced color adjustment" after the operator has selected an image type "photograph/still life/flower";

FIG. 20 illustrates an image type memory region M2:

FIG. 21 Illustrates an image portion whose regional data is defined according to a format type (0);

FIG. 22 illustrates another image portion whose regional data is defined according to the other format type (2);

FIG. 23 illustrates a printing characteristic memory region M1; and

FIG. 24 illustrates a printing characteristic setting region M3.

DETAILED DESCRIPTION OF THE PREFERRED EMBODIMENT

Figure 1:
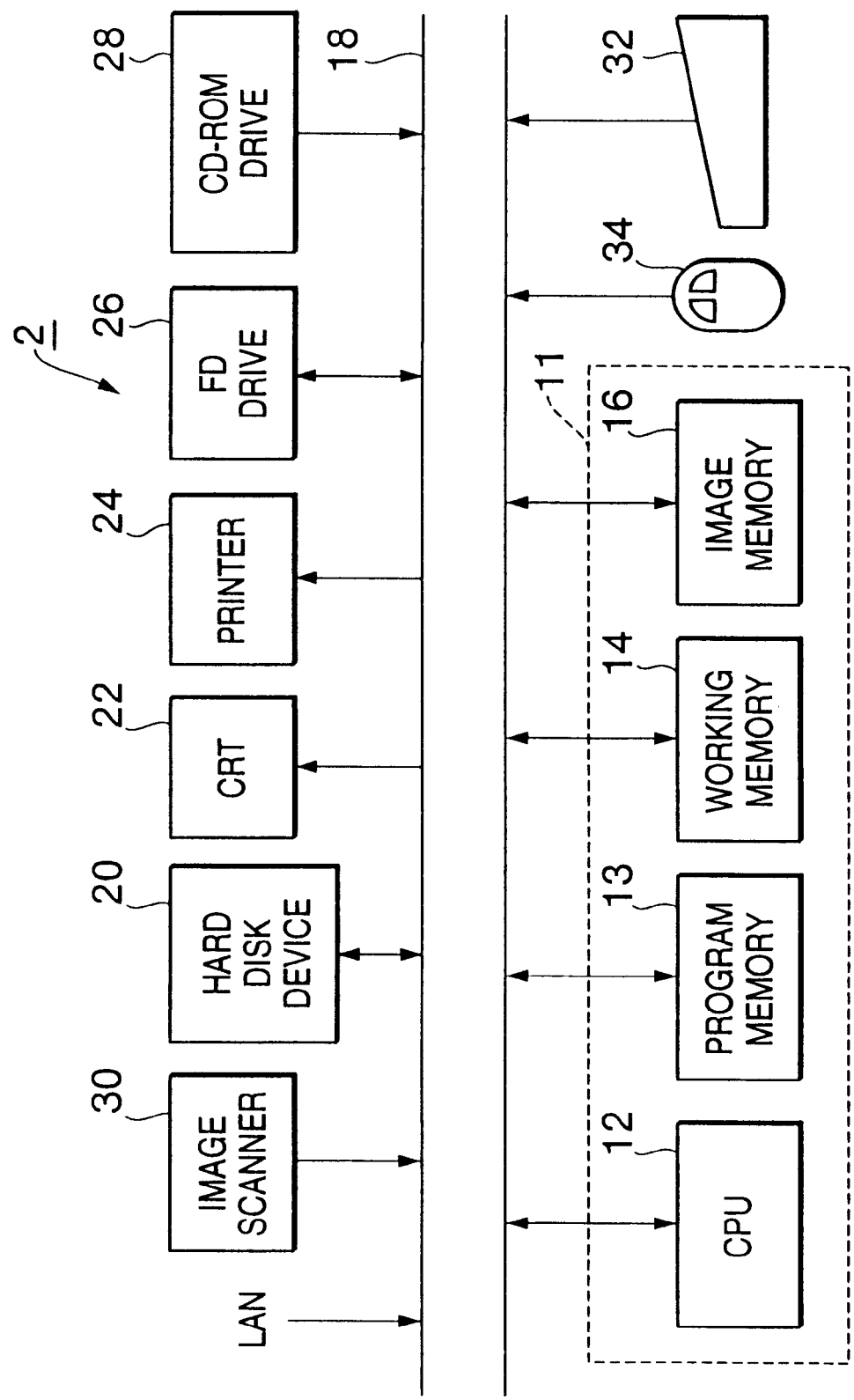
FIG. 1 is a block diagram showing a main portion of a printing characteristic setting device of an embodiment of the present invention.

A printing characteristic setting device according to a preferred embodiment of the present invention will be described while referring to the accompanying drawings wherein like parts and components are designated by the same reference numerals.

FIG. 1 is a block diagram showing a printing characteristic setting device 2 of the present embodiment.

The printing characteristic setting device 2 is mainly comprised of a microcomputer portion 11. The microcomputer portion 11 includes: a CPU 12; a program memory 13 constructed from a ROM; a working memory 14 constructed from a RAM; and an image memory 16 constructed from another RAM. A bus line 18 is provided to connect the microcomputer portion 11 with a hard disk device 20; a CRT display 22; an ink jet color dot printer 24; a floppy disk drive 26; a CD-ROM drive 28; an image scanner 30; a mouse input device 34; and a key board 32. The bus line 18 is further connected to a communication line for, such as, a LAN network, through which various data is transmitted and received. An operator can input various instructions to the printing characteristic setting device 2 via the bus line 18 by manipulating the key board 32 and the mouse input device 34.

The hard disk 20 previously stores therein several image editing software programs (application software programs). The image editing software programs include: a word processing software program; a photographic image editing software program; an illustration image editing software program; a business graphic software program; a DTP application software program; and a document editing/printing process program for executing a document editing/printing process of FIG. 2. A program named "Claris Works" produced by Claris Corporation is one example of the DTP application software program.

The word processing software program is for creating and editing texts such as letters and symbols and for producing text data. The photographic image editing software program is for editing photographic images to produce photographic image data. The illustration image editing software program is for editing illustration images to produce illustration image data. The business graphic software program is for creating and editing business graphic images to produce business graphic image data. The DTP application software program is for combining, into composite image data, the text data, the photographic image data, and the graphic/illustration image data produced by the above-described various software programs. The document editing/printing process program is for processing the composite image data and for printing the composite image data.

The CPU 12 performs various operations.

For example, the CPU 12 loads one or more software programs from the hard disk 20 into a program area in the working memory 14 and executes these programs. The CPU 12 receives various types of data, such as text code data, photographic image data, illustration data, and business graphics data. from the hard disk unit 20, a floppy disk loaded in the floppy disk drive 26, a CD-ROM loaded in the CD-ROM drive 28, the image scanner 30, and the LAN communication line. The CPU 12 edits the thus received various types of data with using the above-described various software programs. The CPU 12 then combines the thus edited various types of data into a set of composite image data with using the DTP software program. Thus, each of the various types of data serves as a set of partial image data for the composite image data. In other words, each set of partial image data includes a series of data having the same image data type, such as a photographic type, an illustration type, a graphics type, a text type, and the like. The composite image data is then temporarily stored in the image memory 16 and displayed on the CRT display 22. Each partial image data can be converted into image data for printing based on a corresponding printing characteristic which is originally set by the corresponding software program. The converted printing image data will be transmitted to the ink jet color dot printer 24 to be printed.

Figure 11:
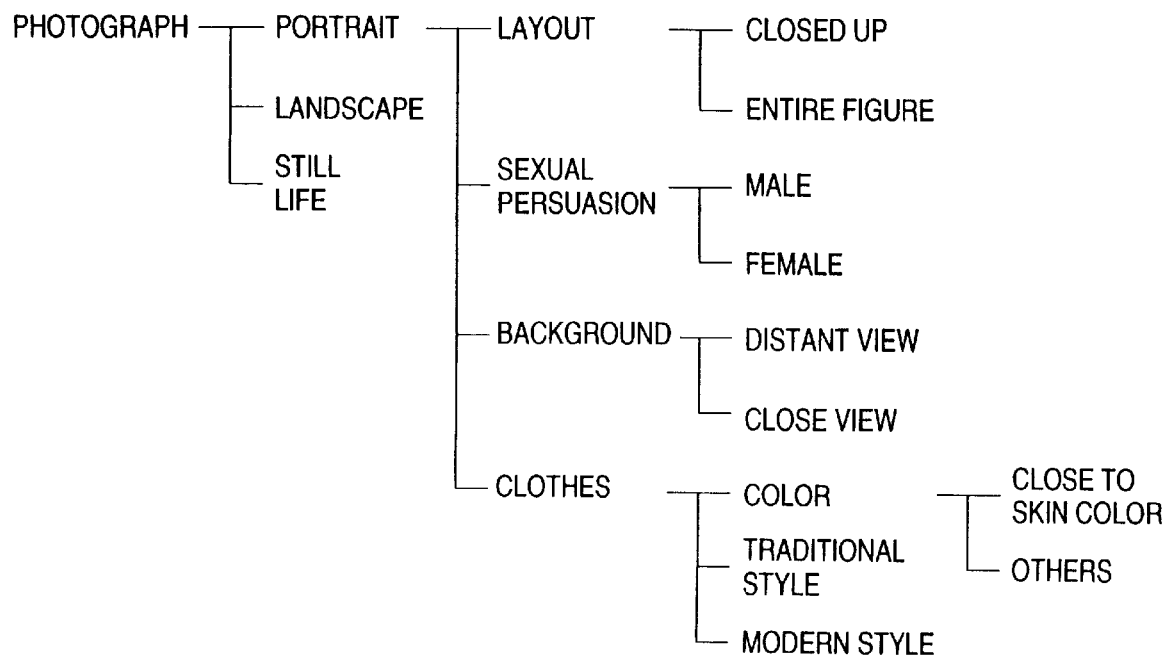
FIG. 11 shows a hierarchy of an image type "photograph"
Figure 12:
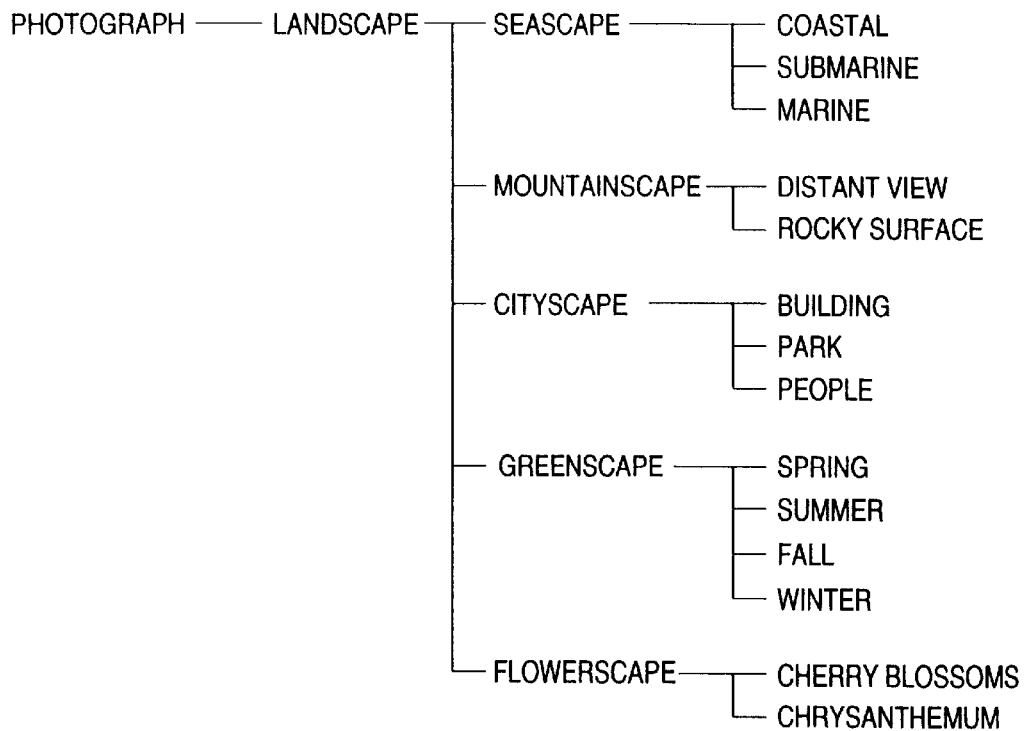
FIG. 12 shows another hierarchy of an image type "photograph"
Figure 13:
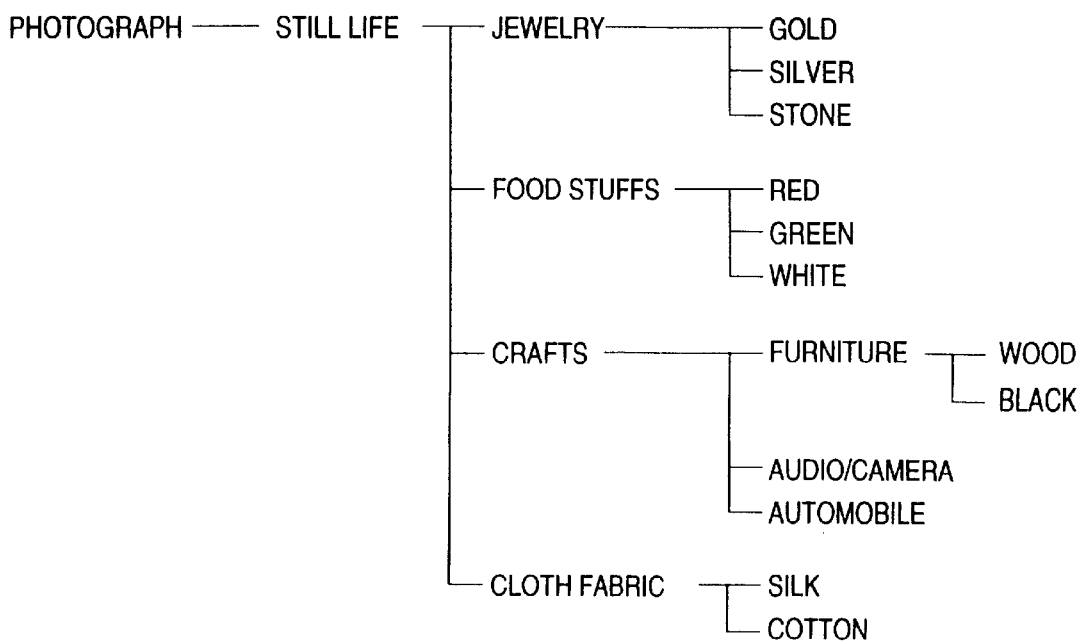
FIG. 13 shows still another hierarchy of an image type "photograph"
Figure 14:
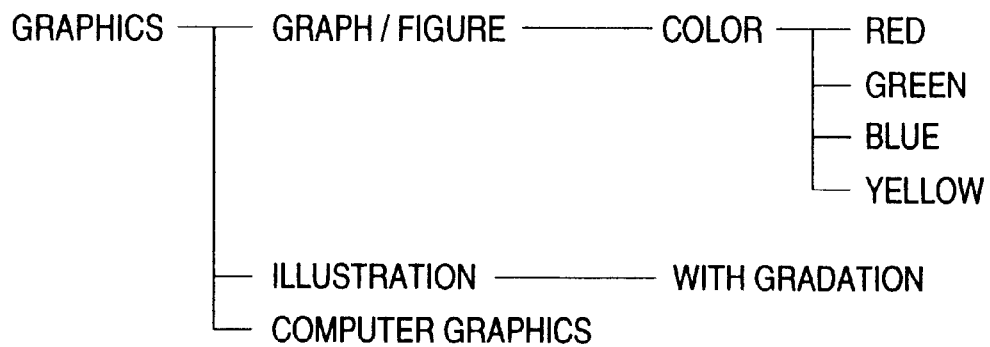
FIG. 14 shows a hierarchy of an image type "graphics"
Figure 15:
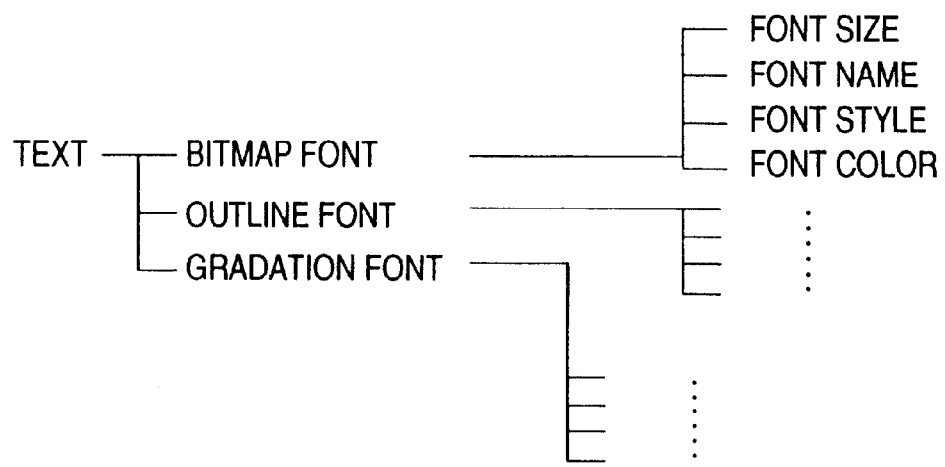
FIG. 15 shows a hierarchy of an image type "text"

The hard disk 20 previously stores therein name data of a plurality of image types. According to the present embodiment, the image types are categorized or classified in a hierarchical structure shown in FIGS. 11 to 15. That is, all the types of images are included in the broadest category (not shown). These all the types of images are categorized into three image types "photograph," "graphics," and "text". The three image types are therefore defined as intermediate categories. As shown in FIGS. 11–13, the image type "photograph" is further categorized into three image types (narrower categories): "portrait," "landscape," and "still life". As shown in FIG. 14, the image type "graphics" is categorized into image types (narrower categories): "graph-figure," "illustration," and "computer graphics". As shown in FIG. 15, the image type "text" is categorized into image types (narrower categories): "bitmap font", "outline font", and "gradation (tonal) font".

The hard disk 20 also previously stores therein: a plurality of sets of color adjustment characteristic item data indicative of a plurality of color adjustment characteristics; and a plurality of sets of screen adjustment characteristic item data indicative of a plurality of screen adjustment characteristics. The color adjustment characteristic item data and the screen adjustment characteristic item data will be referred to collectively as "printing characteristic item data" hereinafter.

The plurality of color adjustment characteristics and the plurality of screen adjustment characteristics are organized also in a hierarchical structure, a part of which is shown in FIGS. 19(a)–19(e). That is, the color adjustment characteristic is mainly categorized into three adjustment characteristics: "vivid/clear" adjustment, "normal" adjustment, and "enhanced" adjustment. The screen adjustment characteristic is mainly categorized into two adjustment characteristics: "fine" adjustment; and specific adjustment which is determined by a specific pattern and resolution.

Each of the three color adjustment characteristics may be further categorized into one or more adjustment types in accordance with an image type to be adjusted.

For example, for an image type "photograph/portrait/skin," the "enhanced" adjustment characteristic is categorized into several adjustment types in accordance with: a place where an image of the subject image type is located; a gender of a person to whom the image of the subject image type belongs; and whether or not the image of the subject image type represents women's skin color. Similarly, for an image type "photograph/still life/flower," the "enhanced" adjustment characteristic is categorized into several adjustment types in accordance with a kind of the flower represented by the subject image type. The adjustment type for "cherry blossoms" is further classified into several adjustment types in accordance with the state of the cherry blossoms.

The hard disk 20 also stores therein data of a plurality of printing characteristic selection menu screen boxes which are produced based on all the sets of printing characteristic item data. Examples of several menu screen boxes are shown in FIGS. 19(a)–19(e). Although not shown in the drawings, other various printing characteristic selection menu screen boxes are stored in the hard disk 20 to display all the printing characteristics.

The hard disk 20 further stores therein a plurality of sets of color adjustment data in correspondence with the plurality of color adjustment characteristics. The plurality of sets of color adjustment data are 3DLUT (three dimensional look up table) data files indicative of a plurality of different color conversion properties. In each 3DLUT data file. a plurality of color data sets (R, G, B) are arranged in a RGB three dimensional color space, and a converted color data set (R', G', B') is located at each location represented by the color data set (R, G, B).

The hard disk 20 also stores therein a plurality of sets of screen data in correspondence with the plurality of screen adjustment characteristics. The screen data sets are a plurality of different sets of binarization (quasi-halftone) data each for binarizing image data through a corresponding error diffusion method, dither method, or the like.

The hard disk 20 or the ROM 13 is previously formed with a printing characteristic memory region M1 as shown in FIG. 23. The printing characteristic memory region M1 stores therein a set of default printing characteristic item data for each of all the image types listed in the hierarchical structure of FIGS. 11–15. The set of default printing characteristic data is comprised of a set of default color adjustment characteristic item data and a set of default screen adjustment characteristic item data. The set of default color adjustment characteristic item data is indicative of one color adjustment characteristic that is selected from all the color adjustment characteristics as optimum for the corresponding image type. The set of default screen adjustment characteristic item data is indicative of one screen adjustment characteristic that is selected from all the screen adjustment characteristics as optimum for the corresponding image type. For example. for the image type "photograph", a "normal" color adjustment and a "fine" screen adjustment are set as the default printing characteristic. For the image type "photograph/portrait", an "enhanced" color adjustment and a "fine" screen adjustment are set as the default printing characteristic.

Even though the default printing characteristic is set for each image type, the operator can change, for his/her desired image type, the default printing characteristic into his/her desired printing characteristic which is selected from all the printing characteristics.

The working memory 14 previously stores therein image distinction characteristic data. The image distinction characteristic data contains a great variety of information, such as a plurality of predetermined color regions and a plurality of predetermined outline shapes. The image distinction characteristic data is used for determining image types of various image portions in a composite image. That is, properties of each image portion is compared with the image distinction characteristic data, whereby an image type is determined for each image portion as will be described later.

For example, the image distinction characteristic data includes color difference threshold data indicative of a predetermined threshold value D of color difference. When a color difference between two different colors is smaller than the threshold value D, the two colors are regarded as the same color.

The image distinction characteristic data also includes color regional data indicative of predetermined color regions such as predetermined skin color regions and predetermined nature green (verdure) color region. For example, the nature green color region is defined as a set of color regional data (L*, a*, b*) according to the Lab colorimetric system wherein L*=55±10, a*=−30±15, and b*=10±4. This set of color regional data indicates a color range how the nature green color region extends around its color center (55, −30', 10).

The image distinction characteristic data also includes a plurality of sets of outline shape distinction data indicative of a plurality of predetermined outlines shapes. A set of outline shape distinction data for each outline shape includes: data K indicative of kinds of lines, such as linear lines, circles, curved lines, constituting the outline; data INF indicative of the number of inflection points on the outline: and data INT indicative of the number of intersections between the constituent lines. For example, outline shape distinction data for a graph-figure includes: data K indicating that the outline is comprised of linear lines and/or circular lines; data INF indicating that the number of inflections is smaller than 10; and data INT indicating that the number of intersections is small. Outline shape distinction data for a computer graphics includes: data K indicating that the outline is comprised of a great number of curved lines; data INF indicating that the number of inflection points is large; and data INT indicating that the number of intersections is large. Other various sets of outline shape distinction data are stored for indicating a plurality of predetermined shapes such as circles, rectangles, and the like.

Figure 2:
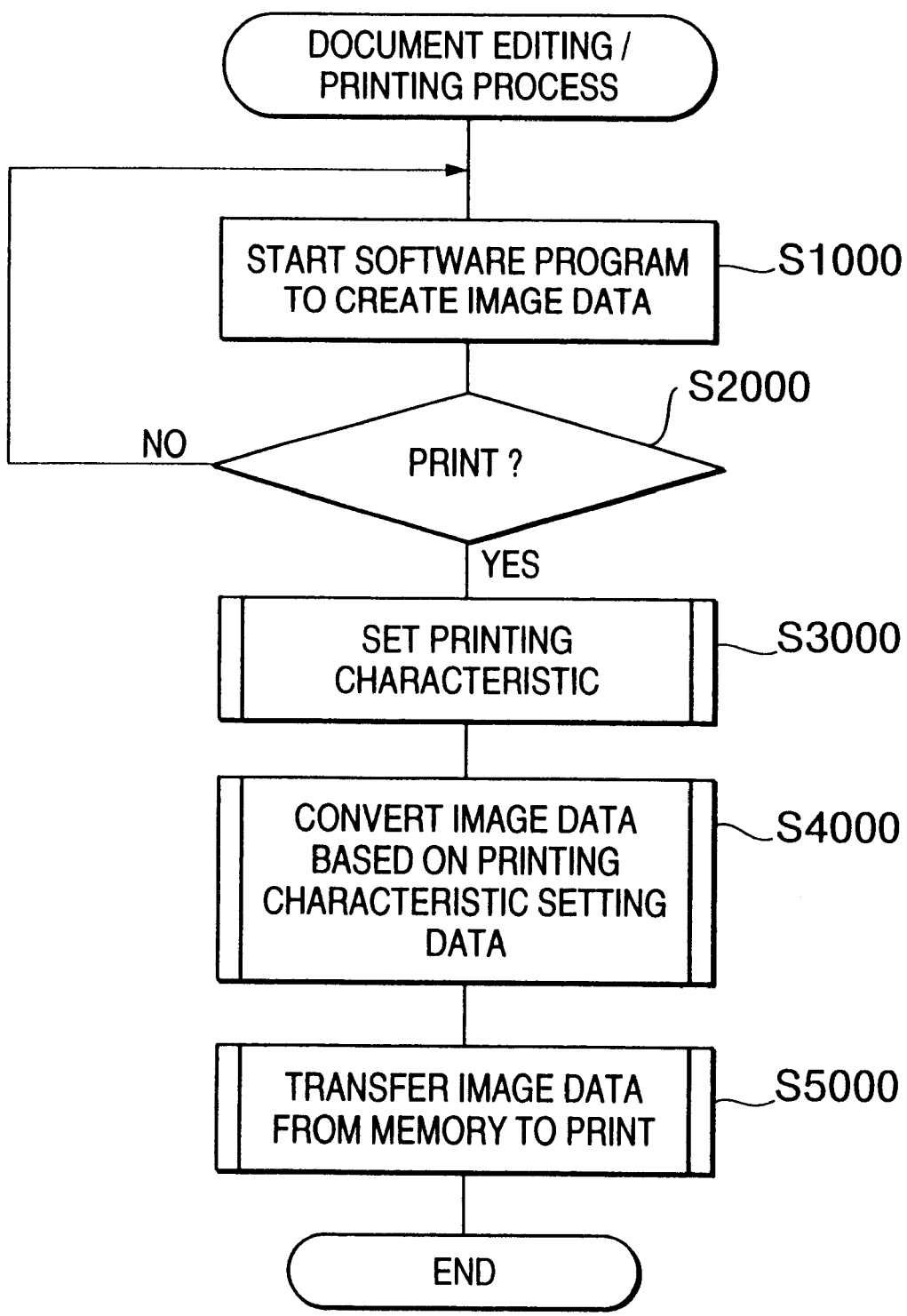
FIG. 2 is a flowchart of a document editing/printing process performed by the printing characteristic setting device of FIG. 1.

With the above-described structure, the printing characteristic setting device 2 performs the document editing/printing process as shown in FIG. 2.

The document editing/printing process will be described below.

When the document editing/printing process is started, an operator creates a set of composite image data in s1000 by utilizing the various application software programs.

The process in S1000 will be described below.

The CRT display 22 first displays all the image editing software programs stored in the program memory 13. The operator clicks the mouse type input device 34 when a location of a mouse cursor is on an indication of an image editing program desired to be used. The operator thus selects his/her desired one or more image editing software programs. As a result, the selected image editing software programs are loaded into the working memory 14 from the hard disk 20. Then, the image editing software programs are selectively started to be executed.

When each image editing program is started, image data to be edited by the image editing program is retrieved from the hard disk 20, the floppy disk drive 26, the CD ROM drive 28, the image scanner 30, or the like. The retrieved image data is stored in the working memory 14 and is edited in various manners. Display image data for displaying the image data on the CRT display 22 is newly created by the CPU 12 or is produced through converting the image data in the working memory 14. The display image data is then stored in the image memory 16 before being displayed on the CRT display 22. Each image editing software program can perform a corresponding editing operation.

For example, with each of the photographic image editing program and the business graphic illustration image editing program, the CPU 12 can perform a trimming operation on the images stored in the memories 14 and 16. The CPU 12 can create new graphs, change the shapes and colors of the images, and change multi-gradation images into binary images through a dither method or an error diffusion method. The CPU 12 can also decrease the number of colors in the images to produce display image data. The CPU 12 can store the thus edited image data in the image memory 16. Alternatively, the CPU 12 can produce edit setting data indicative of the above-described editing operations. The CPU 12 can store, in the image memory 16, the original, unprocessed image data together with the edit setting data.

With the word processing program, the CPU 12 can rewrite, into text data, text code data stored in the working memory 14. The CPU 12 can change sizes and font types of letters represented by the text data, and change an image layout for displaying the text on the CRT display 22. The CPU 12 can store the thus edited image data in the image memory 16. Alternatively, the CPU 12 can produce edit setting data indicative of the above-described editing operations. The CPU 12 can store, in the image memory 16, the original, unprocessed image data together with the edit setting data.

Thus, the CPU 12 produces various types of edited image data or various types of image data with edit setting data.

The CPU 12 further executes the DTP application software program to combine the thus obtained various types of image data, created by the respective software programs, into a set of composite image data. This composite image data set is stored in the working memory 14, and at the same time, in the hard disk device 20 and the like. Thus, the data editing processes in S1000 are completed.

It is noted that each type of image data (partial image data) forming the composite image data can be printed based on an original printing characteristic which is set by a corresponding software program.

Figure 9:
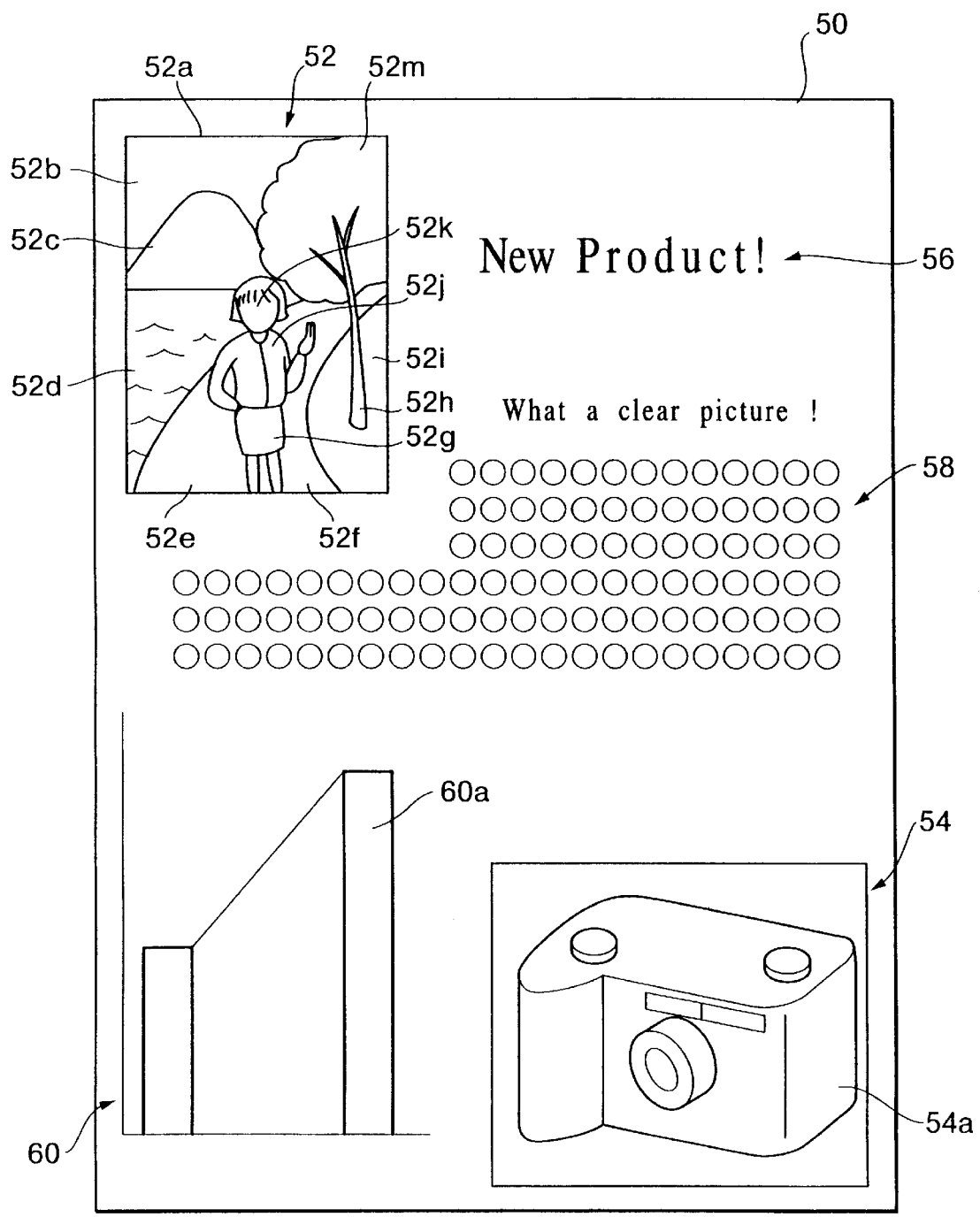
FIG. 9 illustrates an example of an image represented by image data.

It is assumed that a set of composite image data 50 shown in FIG. 9 is created during S1000. The composite image data 50 is a composition of a plurality of sets of partial image data 52, 54, 56, 58, and 60. Each set of partial image data includes a series of data having a corresponding image data type. Each set of partial image data is therefore edited in S1000 by a corresponding software program. That is, a set of partial image data indicative of a photographic image region 52 is edited by the photograph editing program. A set of partial image data indicative of another photographic image region 54 is edited by the photograph editing program. A set of partial image data indicative of a text image region 56 is edited by the word processing program. A set of partial image data indicative of another text image region 58 is also edited by the word processing program. A set of partial image data indicative of a graphic image region 60 is edited by the illustration image editing program. Each set of partial image data will be referred to as a "job" hereinafter.

After the data editing operation of S1000, when the operator desires to print out the created composite image 50, the operator designates a "print" instruction on a menu screen (not shown) displayed on the CRT display device 22. That is, the operator locates a mouse cursor on the "print" instruction indication on the display and clicks the mouse input device 34. As a result, the program proceeds via S2000 to S3000 where a printing characteristic setting process of FIG. 3 is executed for each set of partial image data.

Figure 3:
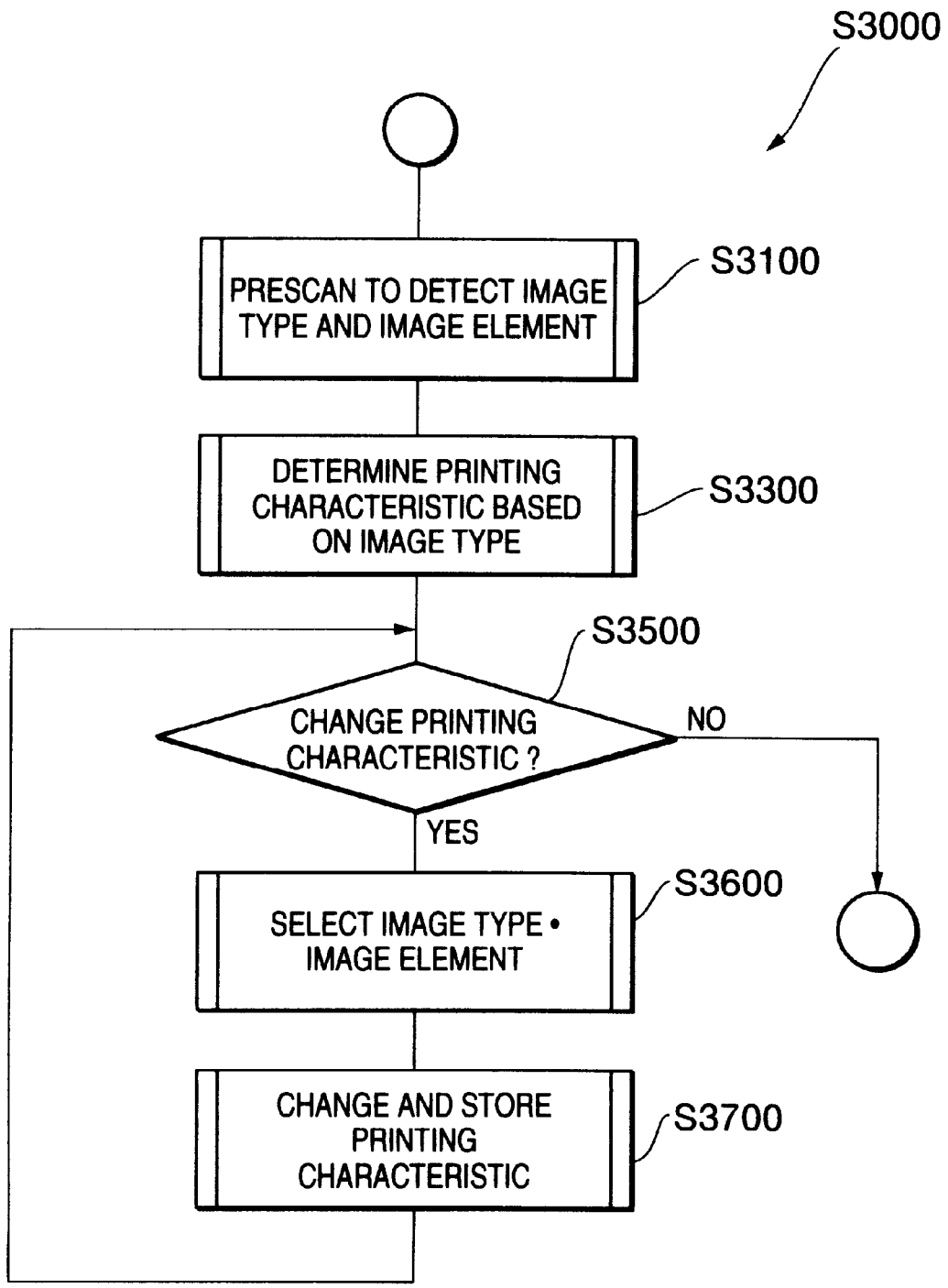
FIG. 3 is a flowchart of a printing characteristic setting process.

As shown in FIG. 3, the composite image data set 50 presently stored in the working memory 14 is pre-scanned in S3100 to determine image types of the respective partial image data sets 52–60 and to determine image types of image elements forming each partial image data set.

Figure 4:
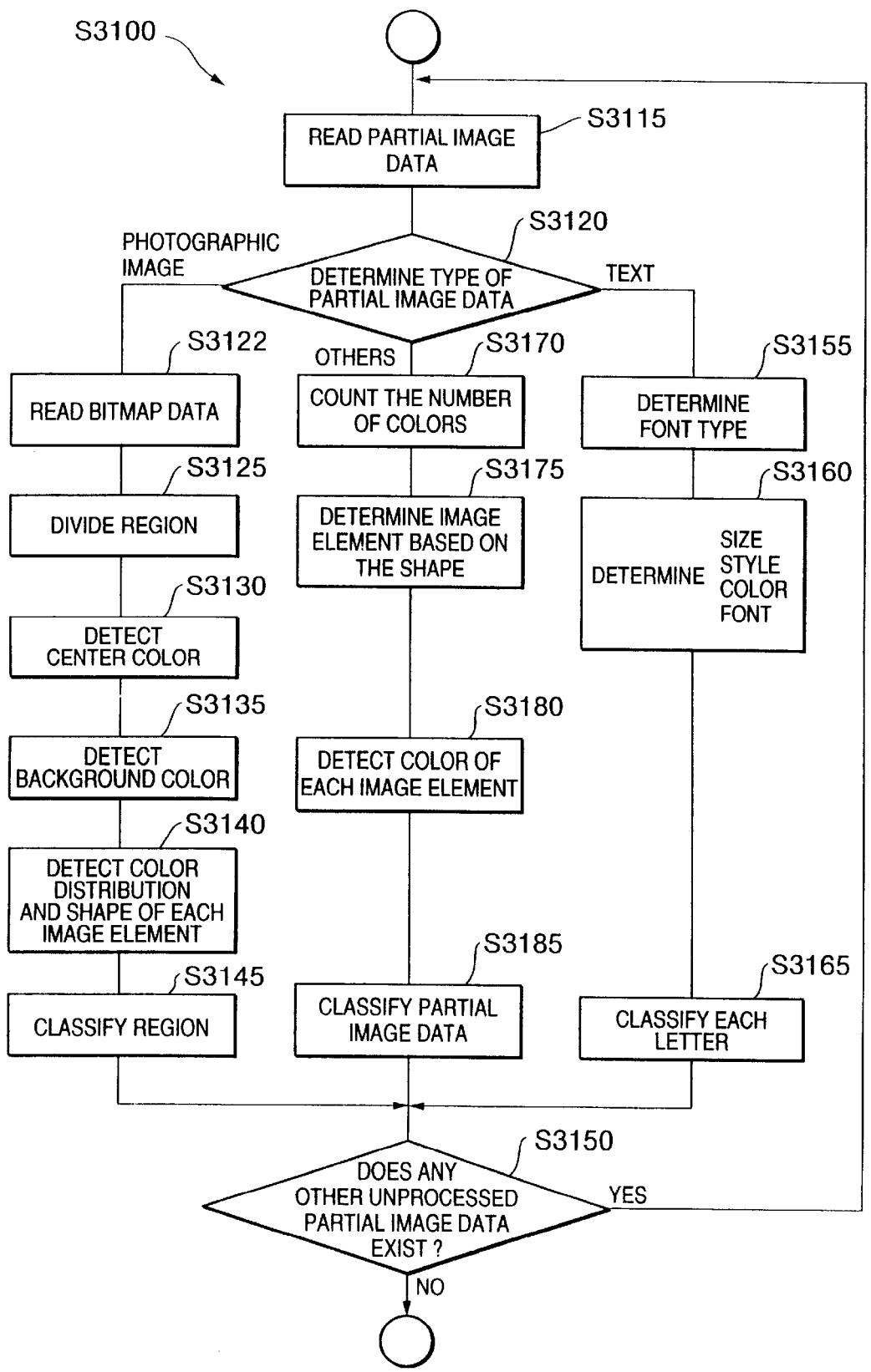
FIG. 4 is a flowchart of a process for scanning a document to detect image types and image elements.

This image type determination process of S3100 will be described below with reference to FIG. 4.

First, in S3115, one set of partial image data is extracted from the composite image data set 50. The partial image data set is retrieved from the working memory 14.

Next, an image type of the retrieved partial image data set (job) is determined in S3120. This determination is achieved based on a format of a code indicative of a leading end of the retrieved partial image data set. Alternatively, this determination may be achieved based on a code, indicative of a format of the partial image data set, which is being located immediately after the leading end code of the partial image data Bet. This determination method is described in greater detail in European Patent Application Publication No.0 665 676 A2. In this example, the image type is determined as either one of "photographic image", "text", and "others including illustration, such as business graphics".

It is now assumed that the partial image data set 52 is retrieved in S3115. Because this set of partial image data is constructed from a series of bit map data, the image type of the data set 52 is identified in S3120 as "photograph".

The partial image data 52 of the image type "photograph" is then subjected to processes of S3122–S3145.

In S3122, data of all the pixels in the present partial image data set 52, that is, the bit map data, is read out from the working memory 14. Then, in S3125, while referring to the bit map data, the photographic image region 52 is divided into one or more image elements through a well-known technique. For example, the photographic image region 52 is divided into one or more image elements while referring to brightness and hue degrees indicated by the bit map data. This method is described in great detail in U.S. Pat. No. 4,958,217. It is noted that the photographic image region 52 may be divided into one or more image elements with using a fuzzy inference. This method is described in great detail in Japanese Patent Lald-Open publication No. HEI-7-193710.

It is now assumed that the region 52 is divided into eleven image elements 52b–52m as shown in FIG. 9.

Then, in S3130, the CPU 12 determines color of at least one of the image elements 52b–52m that is located at the central area of the present image region 52. The determined color is referred to as a center color. In this example, the color of the image element 52k is determined as the center color.

Then, the CPU 12 detects, in S3135, color and area size of at least one of the image elements 52b–52m that contacts with a frame 52a of the partial image 52. Based on the determination, background color of the present image region 52 is determined. In more concrete terms, color of one image element, that has an area size larger than a predetermined area size and that contacts with the frame 52a, is determined as a background color. In this example, the color of the region 52d is determined as a background color of the image region 52.

Next, shape, color, and color distribution degree of each of the image elements 52b–52m are detected in S3140.

For example, a mean color of each of the image elements 52b–52m is calculated based on the series of pixel data (bit map data) indicative of each image element.

The color distribution in each image element is determined through calculating maximum and minimum values among values of all the series of pixel data indicative of each image element. The color distribution can be determined through calculating a variance of the values of all the series of pixel data.

The shape of each image element can be determined as follows.

As described already, the working memory 14 previously stores therein the outline shape distinction data indicative of a plurality of predetermined outline shapes. Similarity degrees between each image element outline shape and the predetermined outline shapes are calculated. The similarity degrees are compared with a predetermined threshold value. Then, one of the predetermined outline shapes is selected for each image element. The selected outline shape has a similarity degree higher than the threshold value with regard to the corresponding image element. Thus selected outline shape is determined as a shape of the corresponding image element. It is noted that other various methods can be employed for determining the color, the color distribution. and the shape of each image element.

Next, in S3145, the image type of the subject partial image 52, which has been determined as "photograph" in S3120, is determined more specifically. The more specific image type is determined as either one of the image types "portrait," "landscape," and "still life" which are categories narrower than the category "photograph" according to the hierarchical structure of FIG. 11.

The more specific image type is determined based on the center color and the background color, of the subject partial image data 52. which have been determined in S3130 and S3135. That is, the center color is first compared with the predetermined skin color regions, data of which is previously stored in the working memory 14 as the image type distinction characteristic data. When the center color belongs to the predetermined skin color regions. the more specific image type is determined as "portrait". When the center color does not belong to any of the predetermined skin color regions, on the other hand, the background color is compared with other predetermined color regions for ocean, sky, and mountain, data of which is also previously stored in the working memory 14 as the image type distinction characteristic data. When the background color belongs to one of the color regions for ocean, sky, and mountain and when the background color has a certain amount of color distribution, the more specific image type is determined as "landscape."

It is now assumed that the center color, that is, the color of the image element 52k, belongs to the predetermined skin color region. The photographic image 52 is therefore defined as a portrait.

If the center color 52k does not belong to the predetermined skin color regions, it is judged whether or not the background color 52d belongs to the predetermined color regions indicative of sky color, ocean color, and mountain color. It is further judged whether or not the color distribution value determined for the background color image element 52d is higher than a predetermined threshold value. When the color distribution value for the background color image element 52d is higher than the predetermined threshold value, the subject partial image 52 is defined as a landscape. If the partial image 52 is not defined either as a portrait or landscape, the partial image is defined as a still life.

In this example, the background color, that is, the color of the image element 52d, belongs to the predetermined region for the ocean, and the color distribution value determined for the image element 52*d* is higher than the predetermined threshold value. However, because the image region 52 has already been defined as the portrait based on the center color 52*k*, the region 52 is not defined as a landscape.

Also during S3145, an image type of each of the image elements 52*b*–52*m* is determined based on the corresponding color, color distribution, and shape which are determined in S3140. In this example, because the image type of the image region 52 is determined as "photographic portrait," the image types of the image elements 52*b*–52*m* are determined as image types of narrower categories than the category of the "photographic portrait."

For example, the image elements 52*c* and 52*m*, which are contacted with the frame 52*a*, have a color which belongs to the predetermined color region for nature green and presents a certain amount of color distribution. Therefore, the image types of the image elements 52*c* and 52*m* are determined as "portrait/background/green".

The image element 52*h*, which is contacted with the "green" image element 52*m*, has a color which belongs to a predetermined color region for tree trunks. Accordingly, the image type of the image element 52*h* is determined as "portrait/background/trunk". It is noted that "portrait/background" is a category broader than the categories "green" and "trunk" determined for the image elements 52*c* and 52*m* and 52*h*. In other words, the category "portrait/background" is located at an upper rank than the categories "green" and "trunk" in the hierarchy.

During S3145, the CPU 12 further produces image type data for each of the image portions, i.e., the partial image 52 and the image elements 52*b*–52*m*. The image type data for each image portion includes: regional data indicative of the region of the image portion; data indicative of an image type of the image portion; and a hierarchical relationship between the image portion and other image portions. Then, the CPU 12 stores the produced image type data in an image type memory region M2 formed in the working memory 14 as shown in FIG. 20.

The image type data for each image portion will be described below in greater detail with reference to the image type memory region M2 of FIG. 20.

As apparent from FIG. 20, image type data for each image portion includes: data of an identification number indicative of the image portion, data of an image type of the image portion, regional data indicative of a region of the image portion, data indicative of a format type of the regional data, and attribute data indicative of an identification number of a parent image portion for the subject image portion. It is noted that the parent image portion for the subject image portion is defined as an image portion which has an image type of a category at an immediately upper rank than the image type of the subject image portion and whose region includes the region of the subject image portion.

The image type memory region M2 has a plurality of rows each for storing a set of image type data for one image portion. The image type memory region has five columnar regions: an identification number memory region for storing the identification number data, a regional data format type memory region for storing data of the regional data format type, a regional data memory region for storing the regional data, an image type memory region for storing the image type data, and an attribute memory region for storing the attribute data.

The attribute data will be described below in greater detail.

As described above. the attribute data for each image portion indicates an identification number of a parent image portion for the subject image portion. The parent image portion is defined as an image portion in which the subject image portion exists. The parent image portion has an image type of a category which is defined, according to the hierarchical structure of FIGS. 11–15, as broader than the category to which the image type of the subject image portion belongs. Because no specific image type name is defined at the broadest category which is at the upper rank than the image type "photograph" of the partial image 52, no attributes are set to the partial image 52.

Next, the regional data format type data will be described below in greater detail.

The regional data format type for each image portion is set as either one of format types "0" and "2." The format type "0" is for indicating that a corresponding image portion has a rectangular region as shown in FIG. 21 and that a corresponding set of regional data represents x-y coordinate values of two points at nonadjacent angles. As shown in FIG. 20, a regional data format type "0" is set for the partial image 52, and two opposite end points (Xs0, Ys0) and (Xe0, Ye0) of the partial image 52 are set as the regional data.

The format type "2" is for indicating that a corresponding image portion has an irregular shaped region as shown in FIG. 22. This kind of region is formed with a plurality of main scanning lines (horizontal lines) whose positional data is set as the corresponding regional data as shown in FIG. 20. That is, the regional data for this kind of region includes: data "Line," data "Ystart," and several sets of x-y coordinate data (Xs0, Xe0), (Xs1, Xe1), (Xs2, Xe2), . . . , and (Xsn, Xen). Data "Line" indicates the total number of lines forming the corresponding image region. "Line"=7 in the example of FIG. 22. Data "Ystart" indicates a position of a first line in an auxiliary scanning direction (vertical direction) Y. Each set of coordinate data "(Xsi, Xei)" (where $0 \leq i \leq n$) indicates start and end points of a corresponding line i in the main scanning direction X. Thus, the total number "n+1" of the coordinate data sets (Xsi, Xei) is equal to the number "Line". Seven coordinate data sets (Xsi, Xei) are set as the regional data in this example.

For each image portion, the identification number, the regional data with its format data, and the attribute data are stored together with data of the image type determined as described above. For example, the image type "photograph/portrait" is set for the partial image 52 as shown in FIG. 20. Thus, the CPU 12 produces image type data for the partial image 52 and stores the image type data in the memory region M2 of FIG. 20.

Similarly, image type data is produced and set for each of the image elements 52*b*–52*m*. For example, for the image element 52*m*, the image type data is produced to include identification number data of "m (integer>0)," format type data of "2," regional data "Line," "Ystart," and "(Xs0, Xe0)–(Xsn, Xen)," image type data "photograph/portrait/background/green," and attribute data "0." For the image element 52*h*, the image type data is produced to include identification number data of "m+1," format type data of "2," regional data "Line," "Ystart," and "(Xs0, Xe0)–(Xsn, Xen)," image type data "photograph/portrait/background/trunk," and attribute data "0."

Then, the CPU 12 judges whether or not more than one of the image elements 52*b*–52*m* can be recognized as a group. When more than one image elements can be recognized as a group, the CPU 12 establishes an additional intermediate category. For example, the image elements 52*m* and 52*h* are defined as "portrait/background/green" and "portrait/background/trunk," respectively. Also, the image elements 52m and 52h are located adjacent to each other. Accordingly, the image elements 52m and 52h can be grouped together into a composite image element 52mh. The image type of the composite image element 52mh is determined as "portrait/background/tree" which is a common feature between the image types "portrait/background/green" and "portrait/background/trunk". The image types of the image elements 52m and 52h are redefined as "portrait/background/tree/green" and "portrait/background/tree/trunk," respectively.

This grouping process will be described below in more greater detail.

The CPU 12 first refers to the image type memory region M2 of FIG. 20. By scanning the data stored in the regional data region and the image type data region, the CPU 12 can acknowledge that the image element 52m of the "portrait/background/green" type and the image element 52h of the "portrait/background/trunk" type are located adjacent to each other. Then, the CPU 12 newly creates the composite image element 52mh from these two image elements 52m and 52h. The CPU 12 stores regional data indicative of the region of the composite image element 52mh in the regional data region. The CPU 12 determines the image type of the composite image element 52mh as "portrait/background/tree". Data indicative of the image type is stored in a corresponding image type data region. Additionally, an identification number "new" ("new"=an integer greater than zero) is newly given and stored in the corresponding identification number data region. Next, the image types "portrait/background/green" and "portrait/background/trunk" of the image element 52m and 52h are redefined as "portrait/background/tree/green" and "portrait/background/tree/trunk", respectively. The attribute data for both of the image elements 52m and 52h is replaced with the identification number "new" of the newly-defined composite image 52mh.

Through the above-described grouping processes, the image elements 52b–52m are grouped into various composite image elements. Thus created various composite image elements have image types at various ranks in the hierarchy of FIG. 11. For example, the image elements 52g, 52j, and 52k are grouped into a composite image element 52gjk of an image type "photograph/portrait/layout/entire figure." The image elements 52b, 52c, 52d, 52e, 52f, 52h, 52i, and 52m are grouped into a composite image element 52bcdefhim of the image type "photograph/portrait/background." Thus, the partial image 52, image elements 52b–52m, and their several composite image elements are organized according to the hierarchy of FIG. 11. The image elements, the composite image elements, and the partial image will be referred to collectively as "image portions" hereinafter.

As described above. according to the processes of S3120–S3145, the image type of the present image region 52 is classified into a photographic portrait, the image region 52 is divided into the image elements 52b–52m, the image types of the image elements 52b–52m are classified into the image types at narrowest categories of the photographic portrait, several image elements are joined together into composite image elements, the image types of the composite image elements are newly defined in categories broader than the image types of the image elements 52b–52m, and the image types of the image elements 52b–52m are redefined. Through these processes, all the image elements and all the composite image elements in the present partial image are hierarchically defined and organized.

After all the image elements 52b–52m and all the created composite image elements in the partial image 52 are defined and organized in the image type memory region M2 of FIG. 20, it is Judged in S3150 whether or not any unprocessed partial image data remains in the working memory 14.

When all the partial image data sets 52–60 are completely processed (no in S3150), the program proceeds to S3300. When any partial image data still remains unprocessed (S3150:YES), the program returns to S3115.

When the partial image data 54 is retrieved in S3115, the image data type of the partial image data 54 is determined in S3120 also as "photograph." Then, the partial image data set 54 is subjected to the processes of S3122–S3145 in the same manner as described above. As a result, the photographic image 54 is defined as a "photographic/still life". The image type of an image element 54a in the partial image 54 is determined as "still life/craft/audio-camera." Image type data is produced for the partial image 54 and the image element 54a and are added to the image type memory region M2 of FIG. 20.

When the partial image data 56 is retrieved in S3115, the image type of the partial image data 56 is determined as "text" in S3120. The partial image data 56 is then subjected to processings of S3155–S3165.

That is, a font type of the partial image data 56 is first determined in S3155 as either one of a bitmap font type, an outline font type, and a font type including information of gradation.

Then, in S3160, font characteristics are determined for each letter constituting the text image 56 when each letter can be identified. The font characteristics include: a font size; a font name such as "Ming-cho" and "Gothic"; a font style sugh as "normal," "bold," "italic," and "under-lined"; a font color; and the like.

Then, in S3165, the image type of each constituent letter is hierarchically determined based on the font type determined in S3155 and the font characteristics determined in S3160. According to the hierarchical structure shown in FIG. 15, the image type of each letter is first classified into categories: "bitmap font," "outline font," and "gradation font." The image type is then more specifically classified into narrower categories by the font characteristics, i.e., the font size, the font name, the font style, and the font color.

It is now assumed that a font type of the partial image 56 is determined as "outline" in S3155 and that font characteristics of each letter in the partial image 56 are determined as a "18p" font size, a "Ming-cho" font, a "normal" font style, and a "red" color. Therefore, an image type of each letter in the partial image 56 is determined as "text/outline/18p·Ming-cho·normal·red". Also in S3165, image type data is created and stored in the image type memory region M2 of FIG. 20 for the partial image 56 and for each letter constituting the partial image 56. Then, the program proceeds to S3150.

When the partial image data 58 is retrieved in S3115, the image type of the partial image data 58 is determined also as "text" in S3120. The partial image data 58 is then subjected to processings of S3155–S3165. It is now assumed that a font type of the partial image 58 is determined as "bitmap" and that the font characteristics of each constituent letter are determined as a "9p" font size, a "Gothic" font, a "bold" font type, and "black" font color. In this case, an image type of each letter in the partial image 58 is determined as "text/bitmap/9p·Gothic·bold·black." Then, the image type data is produced and stored in the image type memory region M2 of FIG. 20 for the partial image 58 and each letter constituting the partial image 58.

When the partial image data 60 is retrieved in S3115, the image type of the partial image data 60 is determined as "others". Because the device 2 of the present embodiment classifies an image type of each partial image into either one of "photographic image," "text," and "graphics," the image type of the present partial image data 60 is determined as "graphics." The partial image data 60 is then subjected to processings of S3170–S3185.

That is, the total number of different colors existing in the present partial image 60 is first calculated in S3170.

While performing this calculation, if a difference amount between different colors is within a predetermined range, these colors may be determined as the same color. It is now assumed that there are two colors defined as (r1, g1, b1) and (r2, g2, b2) according to RGB calorimetric system in the present image.region 60. In this case, the CPU 12 first judges whether or not these two colors should be regarded as the same color. In order to perform the judgment, the CPU 12 first calculates a color difference value defined as $\{(r1-r2)^2+(g1-g2)^2+(b1-b2)^2\}^{1/2}$. The CPU 12 then compares the color difference value with the predetermined color difference threshold value D of the image type distinction characteristic data. When the color difference value is smaller than the threshold value D, the two colors are regarded as equal to each other. After performing the judgment, the CPU 12 calculates the total number of different colors existing in the partial image 60.

Variety of shapes appearing within the present partial image 60 are then discriminated in S3175 while referring to the outline shape distinction data in the image type distinction characteristic data. Also in S3175, frequency, at which each of the shapes appears in the present partial image 60, is calculated. Thus discriminated shapes are determined as respective image elements constituting the partial image 60. Thus, the partial image 60 is divided into one or more image element.

Next, the CPU 12 determines color of each image element in S3180. Also, in S3180, the CPU 12 determines whether or not the color is gradated in each image element. In more concrete terms, the CPU 12 calculates a color range in which the color varies in each image element. The CPU 12 then compares an amount of the calculated color varying range with a predetermined threshold amount. When the calculated range amount is greater than the threshold amount, the corresponding image element is determined to have a color gradation. When the calculated range amount is equal to or smaller than the threshold amount, the corresponding image element is determined not to have color gradation.

Next, in S3185, the image types of the present partial image 60 and its constituent image elements are determined more specifically. That is, the image type, which has been determined as "graphics" in S3120, is more specifically determined into either one of "graph-figure," "illustration," and "computer graphics" according to the hierarchical structure of FIG. 14. When the image type of the partial image 60 is determined as the "graph-figure," image types of its constituent image elements are classified by their colors. When the image type of the partial image 60 is determined as the "illustration," image types of its constituent image elements are classified according to whether or not the image elements have color gradations.

This determination is achieved based on the number of colors determined in S3170 and the image element shapes and the color appearing frequency calculated in S3175.

It is now assumed that simple shapes, such as circles, triangles, and rectangles, appear highly frequently in the present partial image 60. The image type of the present partial image 60 is therefore determined as "graph-figure." If several colors are determined to exist within the present partial image 60, on the other hand, the image type of the partial image 60 is defined as "illustration." If the image type of the partial image 60 is not determined as either "graph-figure" or "illustration", the data type is defined as "computer graphics".

It is noted that the image type can be determined as "graph-figure" or "computer graphics" while referring to the outline shape distinction data sets (K, INF, INT) stored in the working memory 14. When the image type is not determined either "graph-figure" or "computer graphics", the image type may be determined as "illustration".

Image types of constituent image elements are then determined according to the color- or tonal- information obtained in S3180. That is, when the partial image 60 is classified into "graph-figure," image types of constituent image elements are determined based on their colors which are determined in S3180. In this example, a rectangle shaped image element 60a has a color within a predetermined red-color region. Accordingly, the image type of the image element 60a is determined as "graph-figure/color-red."

When the partial image 60 is classified into "illustration," on the other hand, image types of the constituent image elements are determined based on whether the image elements have any color graduation, which is determined in S3180. If an image element in an "illustration" partial image is determined to have a color gradation, the image type of the image element is defined as "illustration/with graduation." If another image element in the "illustration" partial image is determined not to have any color gradation, the image type of the image element is defined as "illustration/without graduation."

During S3185, then, the CPU 12 produces image type data for the partial image 60 and all the constituent image elements, and stores the image type data in the image type data memory region M2 of FIG. 20.

Figure 10:
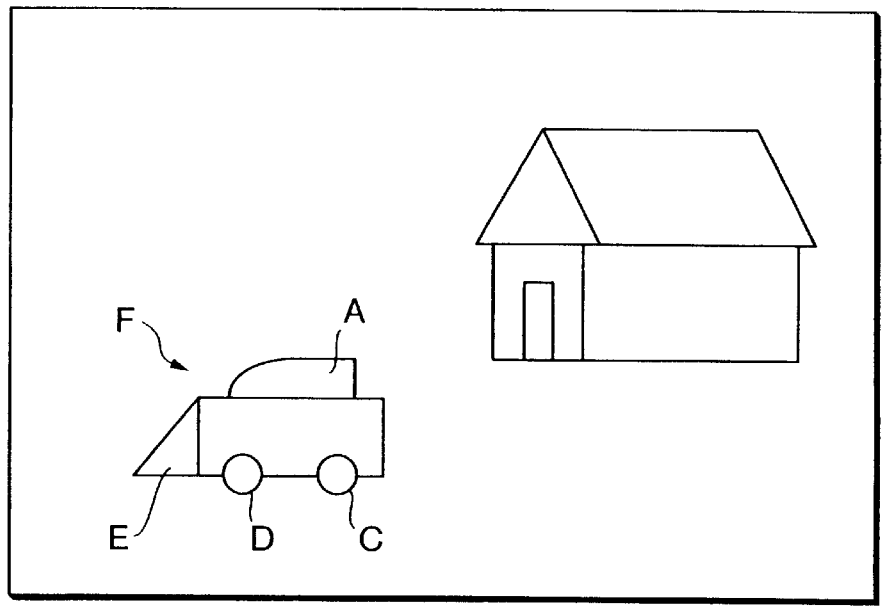
FIG. 10 illustrates an example of another image represented by another image data.

Also during S3185, several image elements constituting the "graphic" type partial image are grouped together into a composite image element. In more concrete terms, if more than one image elements are contacted with each other or partly overlapped with each other, they are grouped into a composite image element. It is now assumed that a "graphic/illustration" type partial image has image elements shown in FIG. 10. The "graphics/illustration" type partial image includes image elements A–E. An image type of each image element A–E is determined as "graphics/illustration/color x." In S3185, a position of each of the image elements A–E is determined with referring to the regional data. According to the regional determination, the image elements A–E are recognized as being contacted with or overlapped with each other. Accordingly, the image elements A–E are grouped together into a single composite image element F. The image type of the composite image element F is therefore determined as "graphics/illustration/group a". At the same time, the image type of each of the image elements A–E is changed from "graphics/illustration/color x" into "graphics/illustration/group a/color x". In the similar manner as in S3145, image type data fox the thus newly-produced composite image element F is additionally stored in the image type memory region M2 of FIG. 20. Image type data for the image elements A–E are changed into the newly-determined data.

Thus, by repeating the above-described processes, all the partial images 52–60 are discriminated, image types of all the partial images 52–60 are determined, each of the partial images 52–60 is divided into its constituent image elements, the resultant image elements are further classified into various image types, and certain image elements are grouped together. As a result, all the image elements and all the composite image elements in all the partial images are properly defined in the hierarchical structure of FIGS. 11–15.

When all the partial images and their constituent image elements are classified (no in S3150), then, the processes of S3100 are completed. Then, the program proceeds to S3300.

Figure 5:
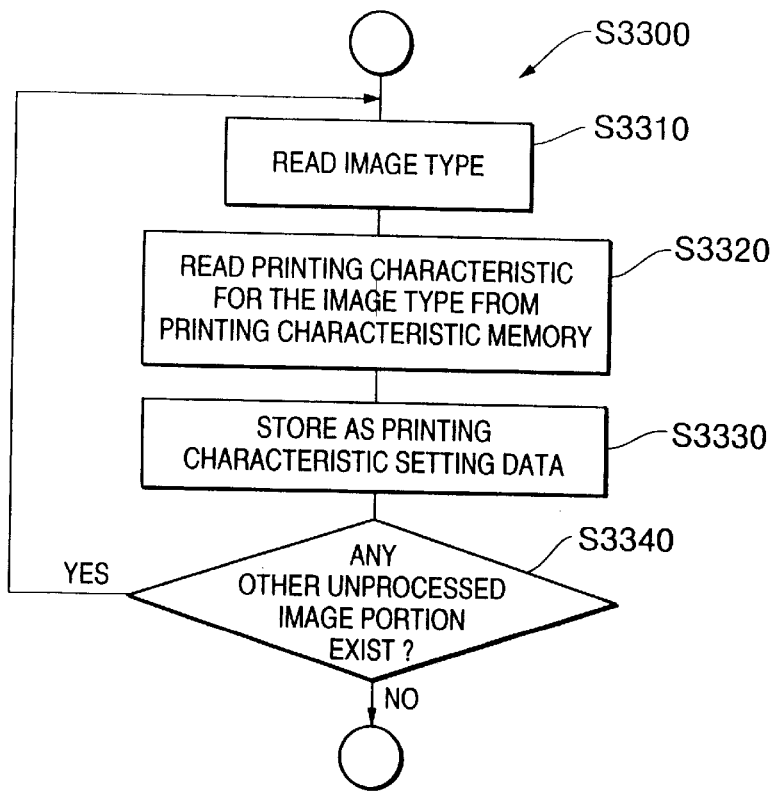
FIG. 5 is a flowchart of a process for setting printing characteristics according to the image types.

Next, in S3300, default printing characteristics are set for all the image portions, i.e., all the partial images, all the image elements, and all the composite image elements, and are set in a printing characteristic setting region M3, formed in the working memory 14 as shown in FIG. 24, as printing characteristic setting data. Details of the process of S3300 will be described below while referring to FIG. 5.

First, in S3310, the CPU 12 retrieves, from the image type memory region M2 of FIG. 20, a set of image type data indicative of an image type of an image portion (partial image, image element, or composite image element). The CPU 12 also retrieves a set of regional data of the subject image portion from the image type memory region M2. The CPU 12 then searches, in S3320, a set of default printing characteristic item data which is stored in the printing characteristic memory region M1 of FIG. 23 in correspondence with the retrieved image type. The CPU 12 retrieves the searched set of default printing characteristic item data. The retrieved set of default printing characteristic item data includes a set of default color adjustment characteristic item data and a set of default screen adjustment characteristic item data. Next, in S3330, the CPU 12 stores the retrieved default color adjustment characteristic item data and default screen adjustment characteristic item data into the printing characteristic setting region M3 together with the retrieved image type data and regional data.

Next, in S3340, the CPU 12 judges whether or not there remains any image portion (partial image, image element, or composite image element) whose printing characteristic has not yet been set. When there remains one or more unprocessed image portion (yes in S3340), the program returns to S3310. When all the partial images, all the image elements, and all the composite image elements have been processed (no in S3340), the processes in S3300 are completed, and the program proceeds to S3500.

In S3500, the CRT display 22 is controlled to display a message box to ask the operator whether or not the operator desires to perform any changes on the default printing characteristic indicated by the default printing characteristic item data set in the memory region M3.

The operator manipulates the mouse cursor 34 or the key board 32 to input his/her desire to or not to change the default printing characteristic. When the operator inputs his/her desire not to change any printing characteristics (no in S3500), the printing characteristic setting processes in S3000 are completed. On the other hand, when the operator inputs his/her desire to change the default printing characteristics set for one or more image types into his/her desired printing characteristics (yes in S3500), the program proceeds to S3600.

In S3600, the operator selects, among the plurality of image typos set in the memory M3, one image type whose printing characteristic is desired to be changed. The CPU 12 selects one or more image portion (partial image, image element, or composite image element) belonging to the selected image type.

Figure 6:
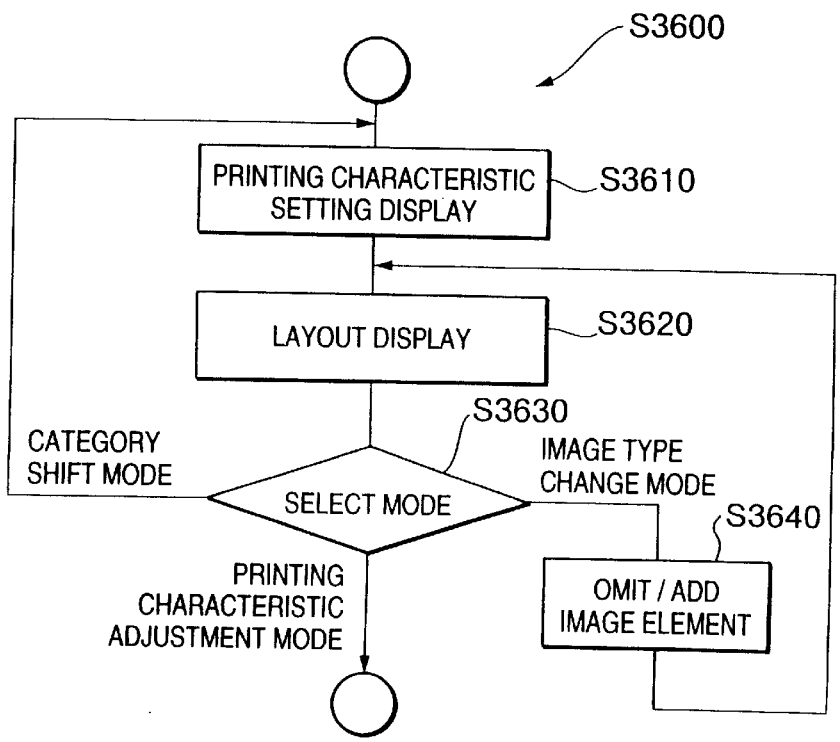
FIG. 6 is a flowchart of a process for selecting an image type subjected to adjustment of the printing characteristics.

The processes in S3600 will be described below in greater detail With reference to FIG. 6.

Figure 16:
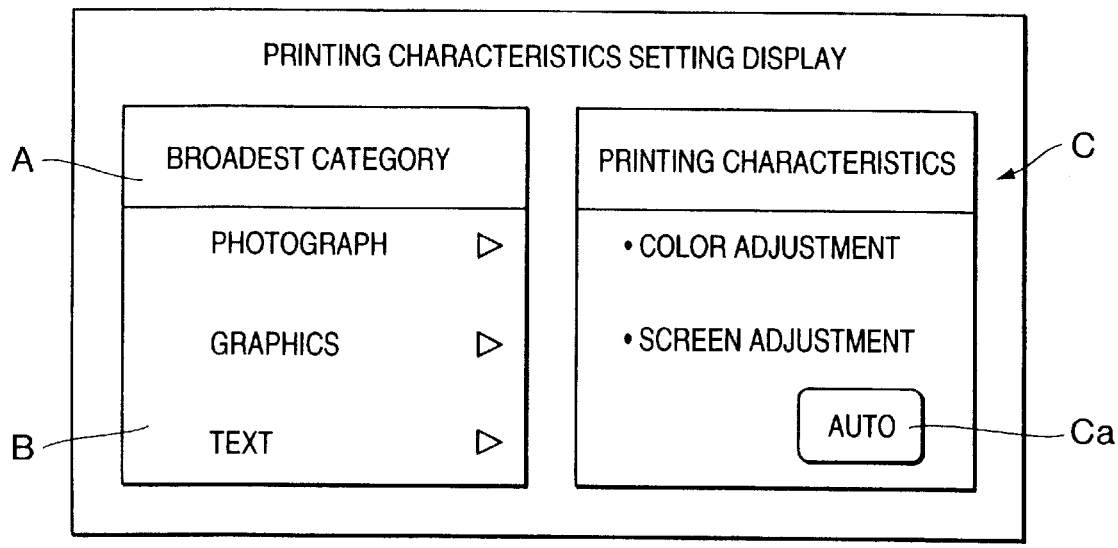
FIG. 16(a) shows a printing characteristic setting screen box displayed at an initial stage.
FIG. 16(b) shows a printing characteristic setting screen box displayed when the present image type is of a narrowest category.
Figure 16:
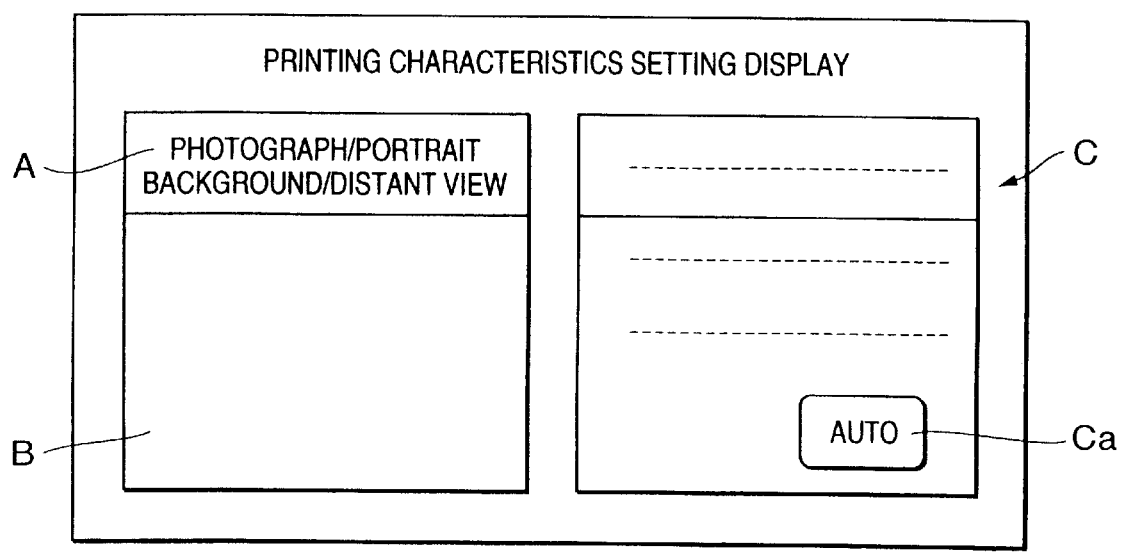

First, the program proceeds to S3610 where the CRT display 22 is controlled to display a printing characteristic setting screen box (printing characteristic selection menu). The CRT display 22 displays the printing characteristic setting screen box based on the name data of the plurality of image types and based on data of the plurality of printing characteristic selection menu screen boxes. At the initial stage, the setting screen box is as shown in FIG. 16(*a*). The printing characteristic setting screen box includes: an image type name listing portion and a printing characteristic item listing portion. The image type name listing portion includes an upper box "A" and a lower box "B." The upper box "A" shows name of a present image type. The lower box "B" shows name of one or more image types which are of narrower categories, according to the hierarchy of FIGS. 11–15, than the present image type shown in the box "A". That is, the lower box "B" shows names of image types which are included in the present image type and which is of a narrower category than the category of the present image type. The printing characteristic item listing portion shows, in a right-side box "C," printing characteristic items to be selected for the present image type shown in the box "A."

As shown in FIG. 16(*a*), at the initial stage, the upper box "A" shows a title "broadest category". The broadest category includes all the image types and therefore are not shown in the hierarchy of FIGS. 11–15. The lower box "B" shows the three image types "photograph," "graphics," and "text" which are of the intermediate categories in the hierarchy of FIGS. 11–15. The box C shows the two printing characteristic items "color adjustment" and "screen adjustment" which are of the broadest categories in the hierarchy of FIGS. 19(*a*)–19(*e*).

Figure 18:
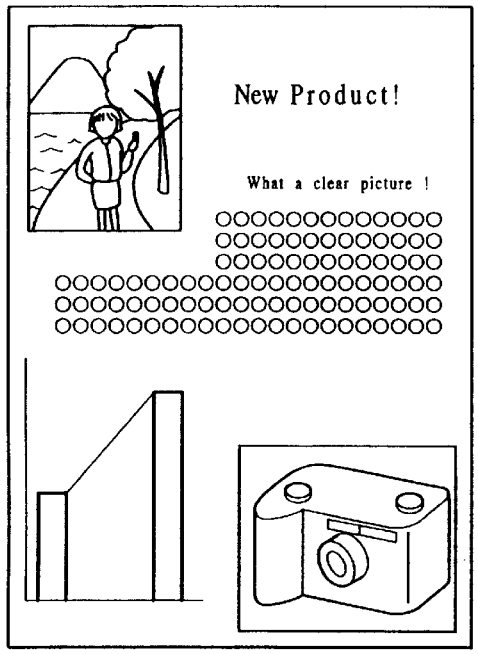
Figure 18:
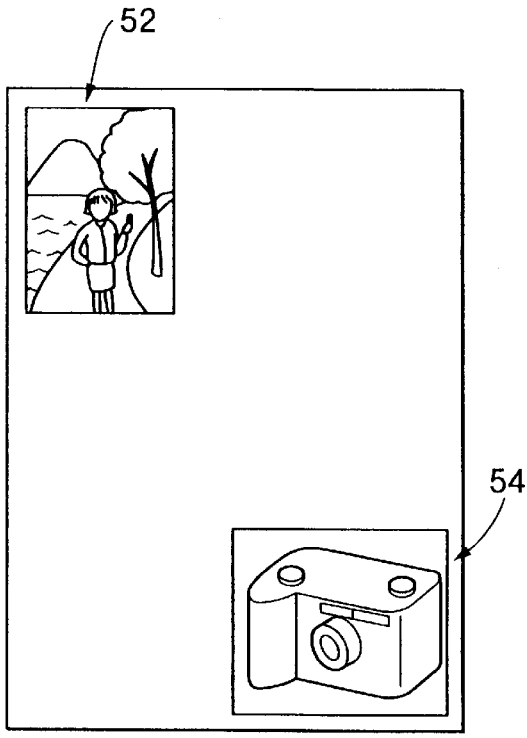
Figure 18:
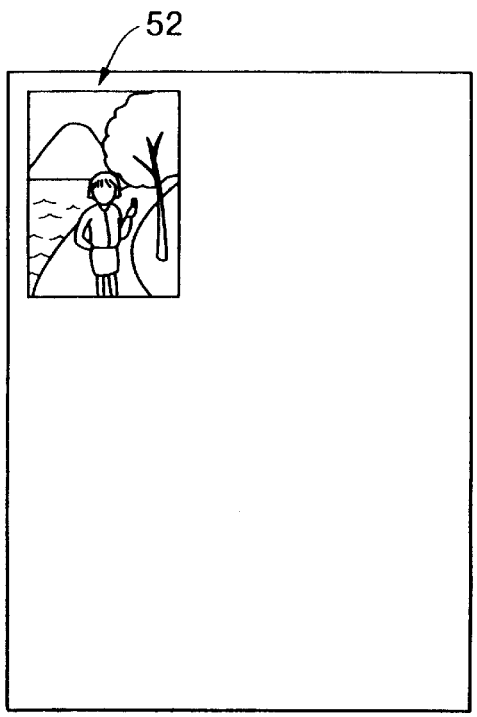
Figure 18:
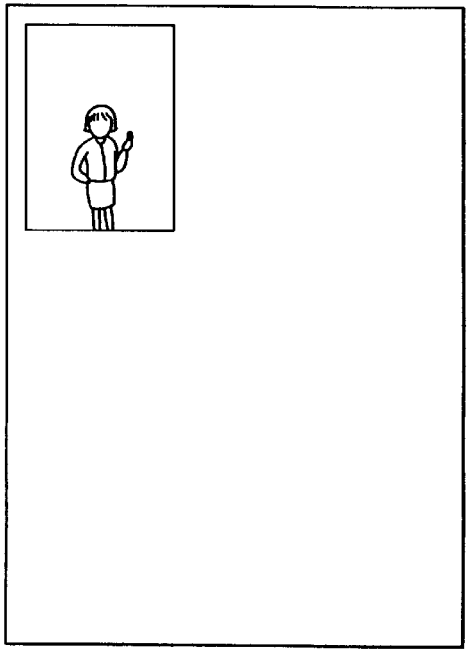
Figure 18:
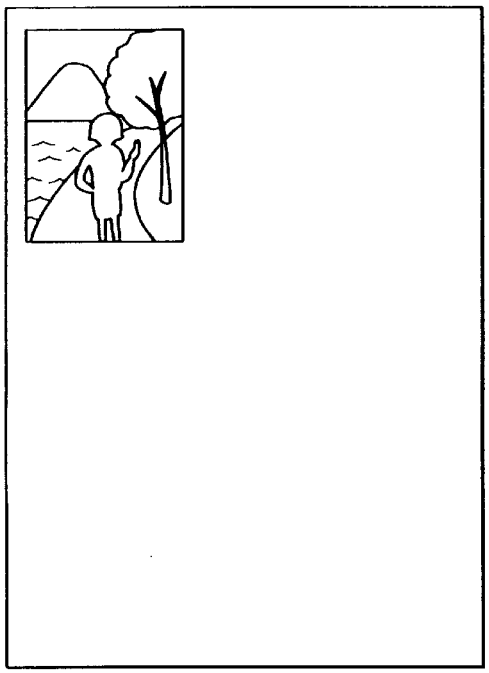
Figure 18:
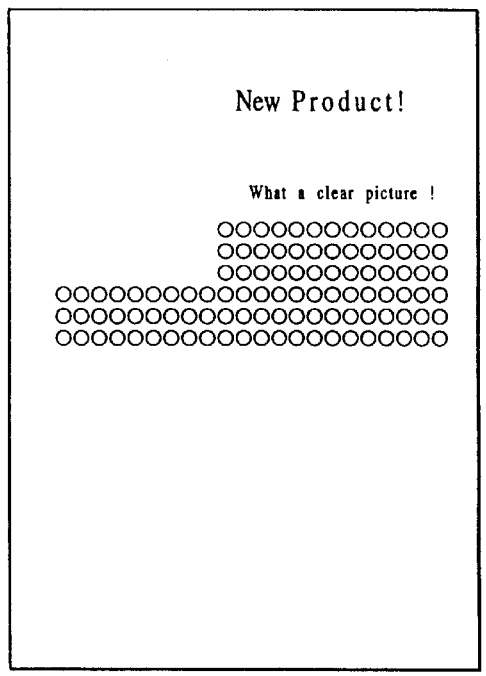
Figure 18:
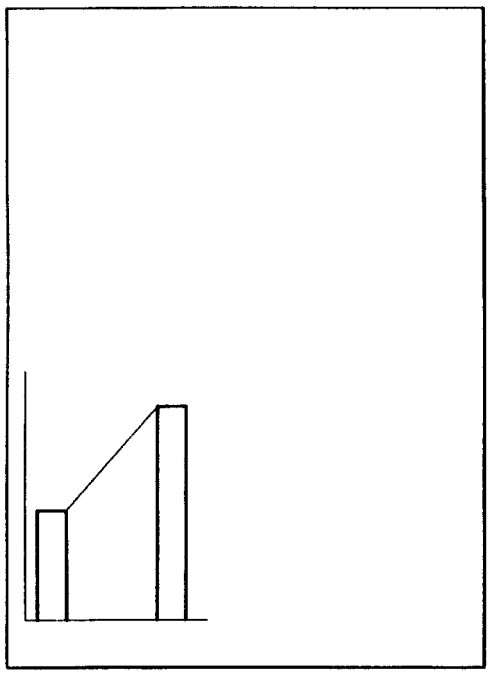
Figure 18:
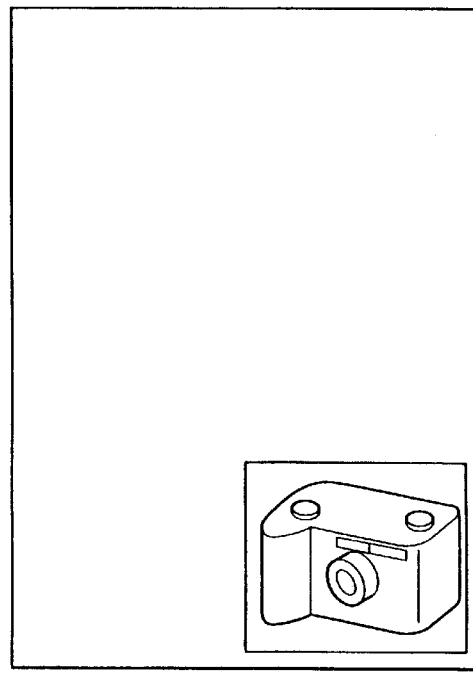

Then, the program proceeds to S3620 where the CRT display 20 is controlled to display an image layout screen box together with the printing characteristic setting screen box of FIG. 16(*a*). The image layout screen box is therefore displayed adjacent to the printing characteristic setting screen box on the same single screen 22. The image layout screen box shows an image whose image type belongs to the present image type displayed in the box "A." At this initial stage, the entire image 50 is displayed as shown in FIG. 18(*a*) adjacent to the printing characteristic setting screen box of FIG. 16(*a*).

The processings in S3620 will be described below in greater detail.

In S3620, the CPU 12 compares all the sets of image type data stored in the image type memory region M2 of FIG. 20 with the present image type shown in the box "A." The CPU 12 searches any image portions (any partial images, any composite image elements, or any image elements) whose image types belong to the present image type. The CPU 12 then retrieves, from the image type memory region M2 of FIG. 20, a set of regional data corresponding to each of the searched image portions. Based on the retrieved sets of regional data, the CPU 12 controls the CRT display 22 to display all of the searched image portions whose image types belong to the present image type. In this initial stage, because all the image portions belong to the image types of the broadest category, the entire image 50 is displayed in the image layout screen box as shown in FIG. 18(*a*).

While observing the printing characteristic setting screen box and the image layout screen box, the operator can select an image type whose printing characteristic is desired to be changed.

The operator performs this selection in a manner as described below.

In S3630, the operator selects a mode among a category shift mode, a printing characteristic adjusting mode, and an image type change mode.

When the present image type shown in the box "A" is not equal to the operator's desired image type, the operator instructs the device 2 into the category shift mode. According to the present embodiment, all the image types are arranged in the hierarchical structure of FIGS. 11–15. The operator therefore has to designate his/her desired image type according to the hierarchical structure. For example, in order to designate an image type "photograph/still life/craft/audio-camera," the operator has to execute the category shift mode to first shift the image type from the broadest category (uppermost rank) to the image type "photograph" at the intermediate category (intermediate rank), then to the image type "photograph/still life" at a narrower category (lower rank), then to the image type "photograph/still life/craft" at a further narrower category (further lower rank), and then finally to the image type "photograph/still life/craft/audio-camera" at a further narrower category (further lower rank).

In order to thus shift the present image type to an image type of a narrower category, the operator may locate the mouse cursor on one of the narrower category image types displayed in the box "B," and then click the mouse input device 34. As a result, the color of a triangle indication located right to the operator's selected image type is changed, thereby indicating that the corresponding image type is selected. On the other hand, when desiring to return the present image type back to an image type of a broader category, the operator may locate the mouse cursor in the box "A" and then click the mouse input device 34.

When the category shift mode is selected in S3630 and the present image type is shifted into an image type of a broader or narrower category, the program returns to S3610 where the printing characteristic setting screen box is displayed for the thus newly-designated image type. FIGS. 17(a)–17(f) are indicative of a display-shift diagram showing how a display content of the image type name listing portion (boxes "A" and "B") is shifted according to the hierarchy structure of FIGS. 11–15. Every time the category shift mode is selected in S3630, the image type name listing portion (boxes "A" and "B") is changed in S3610 according to the newly-designated image type. Then, in S3620, the image layout screen box is changed also according to the newly-designated image type. When the present image type reaches the narrowest category (lowest rank) in the hierarchy of FIGS. 11–15, the display box B is left blank as shown in FIG. 16(b). It is noted that the CRT display 22 continues displaying the printing characteristic item portion (box C) as shown in FIG. 16(a) until the operator selects a printing characteristic adjusting mode in S3630 as will be described later.

Next will be given a detailed description how the repeatedly-executed category shift mode shits the display state of the image type name listing portion (boxes "A" and "B") and shifts the image layout screen box as shown in FIGS. 18(a)–18(h) in the processes of S3610–S3630.

As described above, image types of the partial images 52, 54, 56, 58, and 60 have been respectively determined as "photograph/portrait," "photograph/still life," "text/outline font," "text/bitmap font," and "graphics/graph". Further, more specific image types have been determined for the respective composite image elements and the respective image elements in each of the partial images 52–60.

At the initial stage, in S3610, as shown in FIG. 16(a), the printing characteristic setting display shows: the title "broadest category" in the upper box "A;" the image types "photograph," "graphics," and "text" at the intermediate categories in the lower box "B;" and the printing characteristics "color adjustment" and "screen adjustment" in the box "C." Then, the entire image 50 is shown in the image layout screen box in S3620 as shown in FIG. 18(a).

When the operator selects "photograph" in the lower box "B" in S3630, the category shift mode is automatically executed to return the program to S3610. The display in the display boxes "A" and "B" in FIG. 17(a) shifts to that of FIG. 17(b) for the intermediate category "photograph". Then, the program proceeds to S3620 where the image layout screen box of FIG. 18(a) shifts to that of FIG. 18(b) which displays the partial images 52 and 54 whose image types both belong to the image type "photograph."

In this image layout screen box, the photographic type images 52 and 54 are displayed in a normal display state (normal display mode). On the other hand, although not shown in the drawings, other partial images 56, 58, and 60 are displayed in a simplified state (simplified display mode). For example, the partial images 56, 58, and 60 are displayed as half tone images, blurred images, or contour images. In the simplified display mode, only the regions of the partial images 56, 58, and 60 and their constituent image elements can be acknowledged. Thus, the partial images 56, 58, and 60 are discriminated from the partial images 52 and 54.

Figure 17:
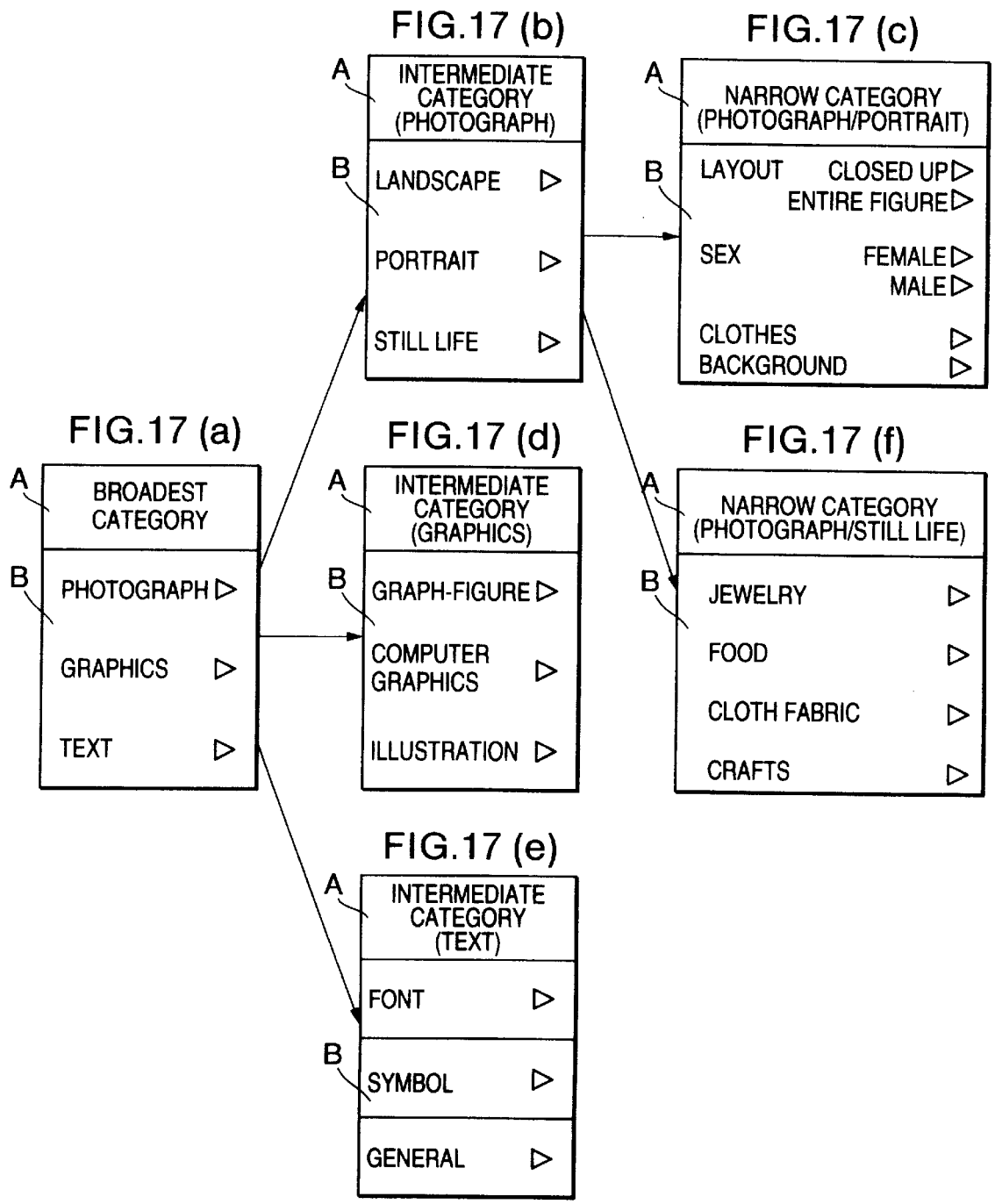

Observing the image type name listing portion of FIG. 17(b) and the image layout screen box of FIG. 18(b), the operator can further select in S3630 an image type of a narrower category. For example, when the operator further selects a narrower category image type "portrait" from the box "B" in the screen box of FIG. 17(b), the category shift mode is executed, and the screen box changes in S3610 from that of FIG. 17(b) to that of FIG. 17(c) for the narrower category "photograph/portrait." Then, the image layout screen box of FIG. 18(c) is displayed in S3620. In this image layout screen box, only the partial image 52 of the image type "photograph/portrait" is displayed in the normal display mode. The partial image 54 is displayed in the simplified display mode similarly as the partial images 56, 58, and 60.

At this time, when the operator further selects a narrower category image type "layout/entire-figure" from the box "B" of the screen box of FIG. 17(c), a composite image element 52gjk indicative of an entire figure is searched out from the partial image 52 while referring to the image type data stored in the image type memory region M2 of FIG. 20. Then, as shown in FIG. 18(d), only the composite image element 52gjk of the entire figure is displayed in the normal display mode. Other remaining image elements are displayed as the simplified images.

On the other hand, when the operator selects another image type "background" from the box "B" of the screen box of FIG. 17(c), data for "background" type composite image element 52bcdefhim is searched out from the image type memory region M2 of FIG. 20. Then, only "background" type composite image element 52bedefhim is displayed in the normal display mode, and other remaining type image elements are displayed as the simplified images as shown in FIG. 18(e).

On the other hand, when the operator selects an image type "graphics" from the box "B" of the screen box of FIG. 17(a), the display changes to the screen box of FIG. 17(d), and the image layout screen box changes to that of FIG. 18(g).

Likewise, when the operator selects an image type "text" from the box "B" of the screen box of FIG. 17(a), the screen box changes to that of FIG. 17(e), and the image layout screen box changes to that of FIG. 18(f).

When the operator selects an image type "still life" from the box "B" of the screen box of FIG. 17(b), on the other hand, the screen box changes to that of FIG. 17(f), and the image layout screen box changes to that of FIG. 18(h).

In this manner, the display state of the image type name listing portion (boxes "A" and "B") is shifted following the hierarchical structure of FIGS. 17(a)–17(f). Because the image layout screen box is shifted accordingly as shown in FIGS. 18(a)–18(h), the operator can easily identify image portions whose printing characteristics are desired to be changed.

Next, an image type change mode of S3640 will be described.

When the operator wants to change the image type which is determined in S3100 for a certain image portion (partial image, composite image element, or image element), the operator can adjust the image type for that image portion in S3640 through omitting the image portion from the present image layout screen box or adding the image portion into the present image layout screen box. When the image portion is added into the present image layout screen box, the image type of the added image portion is set to the present image type that is presently shown in the box "A". When the image portion is omitted from the present image layout screen box, on the other hand, the image type of the omitted image portion can be set to an image type at a broader category than the present image type. When the image type of the image portion is thus changed, the image type data in the image type memory region M2 of FIG. 20 for that image portion is rewritten with the newly-changed image type data. The data contents of the memory region M3 are also changed accordingly.

The omitting/adding process in S3640 will be described below in greater detail.

The operator selects his/her desired image portion (image element, composite image element, or partial image) through locating a mouse cursor on his/her desired image portion displayed on the image layout screen box of FIGS. 18(a)–18(h). Then, the operator clicks the mouse input device 34. Every time the operator clicks, the layout display of the selected image portion is switched between the normal display mode and the simplified display mode. The operator can select, at a time, either one image element, one composite image element, or one partial image through selecting a mode key (not shown) provided to the key input device 32. For example, the operator can designate the composite image element F or one of the image elements A–E shown in FIG. 10.

When the operator clicks the mouse input device 34, the CPU 12 receives a click signal from the mouse input device 34. The CPU 12 also receives a mode signal from the key board 32. Based on the received click signal, the CPU 12 determines a position of the mouse cursor on the image layout display. Then, based on the determined positional data and on the received mode signal, the CPU 12 searches an image element, a composite image element, or a partial image, on which the mouse cursor is placed, from the image type memory region M2 of FIG. 20.

Then, the layout display on the CRT display 22 is switched based on image type data retrieved from the image type memory region M2 of FIG. 20. The image type data of the subject image portion is then renewed based on the present display status as described below.

When the operator desires to add a certain image portion to the present image type, the operator selects that portion by the mouse cursor. When the operator clicks the mouse input device 34, the selected image portion, which has been in the simplified display mode, is switched to be displayed in the normal display mode. Then, the image type of the selected image portion is replaced with the present image type, that is, the image type now displayed in the box "A". That is, the present image type presently displayed on the box "A" is set as the image type of the selected image portion.

On the other hand, when the operator desires to omit a certain image portion from the present image type, the operator selects the certain image portion and then clicks the mouser input device 34. As a result, the selected image portion, which has been in the normal display mode, is switched to be displayed in the simplified display mode. In this case, the image type of the selected image portion is changed as describe below.

First, the process the same as that of S3100 is executed with respect to the selected image portion in order to automatically determine its image type. When the thus determined image type is different from the present image type, the automatically-determined image type is set as the image type for the selected image portion.

On the other hand, when the automatically-determined image type is the same as the present image type, the image type of the selected image portion is changed into an image type of a broader category than the present image type.

It is now assumed that the partial image 52 of the image type "photograph/portrait" is displayed in the normal display mode in the image layout screen box as shown in FIG. 18(c). At the same time, the screen box of FIG. 17(c) is displayed. In this case, when the operator clicks the mouse input device 34 to select the partial image 52, the display mode for the partial image 52 is switched from the normal display mode into the simplified layout mode, thus indicating that the partial image 52 is omitted from the "photograph/portrait" image type. When the image type of the partial image 52 is automatically determined as "photograph/portrait" also in this step, the image type of the partial image 52 is changed into the broader category image type, that is, "photograph."

It is noted that when the image type of the operator's selected image portion belongs to the image type "photograph," "graphics," or "text," the image type cannot be changed into a broader category. For example, when the operator clicks the image 52 or 54 on the image layout screen box of FIG. 18(b), the CPU 12 controls the CRT display 22 to display the image type screen box of FIG. 17(a), thereby allowing the operator to select his/her desired image type among the categories "photograph," "graphics," and "text."

Then, image type data indicative of the thus newly-determined image type is stored in the image type memory region M2 of FIG. 20 for the operator's selected image portion. At the same time, the regional data of the subject image portion is stored in the printing characteristic setting region M3 of FIG. 24 in correspondence with the newly-determined image type.

Thus, the operator repeatedly performs the category shift mode to designate an image type whose printing characteristic is desired to be adjusted. If the operator desires to change the image type determined in S3100 for a certain image portion into another image type, the operator performs the image type change mode. When the category shift mode and the image type change mode are completed, the CRT display 22 displays, in the box "A," the present image type whose printing characteristic is desired to be adjusted. The CRT display 22 displays, in the box "B," image types of narrower categories than the category of the present image type. The CRT display 22 also displays the image layout screen box of image portions whose image types belong to the present image type. That is, the image layout screen box shows one or more image portions whose image types are the same as or are included in the present image type. The CRT display 22 also displays the printing characteristic item screen box (box "C") which is still in the initial mode of FIG. 19(a). That is, the box "C" shows "color adjustment" and "screen adjustment."

While observing the boxes "A" and "B" and the image layout screen box, the operator selects a printing characteristic adjusting mode in S3630 through selecting, from the box "C", one of the "color adjustment" and "screen adjustment" desired to be changed for the present image type. This selection is achieved by locating the mouse cursor on one of the items "color adjustment" and "screen adjustment" and then clicking the mouse input device 34. As a result, the image type selection process of S3600 is completed, whereby the present image type now being displayed in the box "A" is finally selected to be subjected to a printing characteristic adjusting operation. Then, the program proceeds to S3700 where the printing characteristic is changed or adjusted and stored for the image type selected in S3600.

It is noted that the operator may not perform the category shift operation or the image type change operation but may directly select any one of printing characteristics "color adjustment" and "screen adjustment" on the printing characteristic screen box "C" of FIG. 16(a). In this case, the entire image 50 is selected to be subjected to the printing characteristic adjusting operation.

Figure 7:
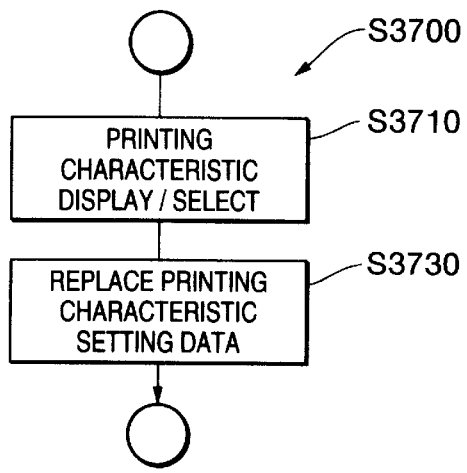
FIG. 7 is a flowchart of a process for adjusting the printing characteristic and for storing the adjusted data.

Next, the printing characteristic adjustment process of S3700 will be described below with reference to FIG. 7.

In S3710, the CRT display 22 is controlled to change the display content of the printing characteristic item listing portion (box "C") in the hierarchy structure as shown in FIGS. 19(a)–19(e) according to the operator's selection of the printing characteristic items.

That is, if the operator selects, in S3710, "color adjustment" from the screen box "C" of FIG. 19(a), the CPU 12 controls the CRT display 22 to show another printing characteristic selection menu (box C) of FIG. 19(b) for a narrower category. Observing the menu screen box C of FIG. 19(b), the operator can select his/her desired color adjustment characteristic. On the other hand, if the operator selects, in S3710, "screen adjustment", the CPU 12 controls the CRT display 22 to show still another printing characteristic selection menu (box C) of FIG. 19(c). observing the menu screen box C of FIG. 19(c), the operator can select his/her desired screen adjustment characteristic. When the operator selects "fine" from the screen box of FIG. 19(c), a fine screen adjustment is selected. When the operator selects "pattern", the display 22 is controlled to show two types "concentric model type" and "Bayer model type". The operator can select one of the displayed two types. When the operator selects "resolution", the display 22 is controlled to show a space for receiving a resolution value. The operator will input a value of his/her desired resolution.

The CPU 12 performs the above-described menu screen box shift-and-display process based on information on the operator's manipulation of the mouse input device 34 and on the printing characteristic item data stored in the hard disk 20.

When the operator selects, from the menu screen box C of FIG. 19(b), the color adjustment to enhance colors into their ideal colors, the CPU 12 controls the CRT display 22 to show a further narrower category menu screen box C, such as a printing characteristic selection menu of FIG. 19(d) or 19(e).

It is desirable that the printing characteristic selection menus of these narrower categories, such as those of FIGS. 19(d) and 19(e), be selectively displayed according to the operator's selected image type. For example, the printing characteristic selection menu of FIG. 19(d) is displayed after the selection menu of FIG. 19(b) when the operator has selected in S3600 the image type "photograph/portrait/skin". On the other hand, the printing characteristic selection menu of FIG. 19(e) is displayed after the selection menu of FIG. 19(b) when the operator has selected in S3600 the image type "photograph/still life/flower". By selectively displaying the selection menus as described above, the printing characteristic selection process can be simplified. Even if data for a great variety of printing characteristics is stored in the device 2, only related selection menus are displayed. This allows displaying the selection menus in a style capable of being easily observed by the operator. Therefore, the operator can easily select his/her desired printing characteristic.

Thus, in S3710, every time the operator clicks, in the selection menu (box "C"), a printing characteristic item, to which his/her desired printing characteristic belongs, the selection menu is successively changed from one to another as shown in FIGS. 19(a)–19(e). When a menu screen box, in which his/her desired printing characteristic is listed, is finally displayed, the operator clicks that printing characteristic.

When the operator desires to change both the default color adjustment characteristic and the default screen adjustment characteristic, the operator may repeat the above-described display-shift operation to designate both of his/her desired color adjustment and screen adjustment.

After thus designating his/her desired color and/or screen adjustment, the operator depresses a setting completion key (not shown) on the keyboard 32, whereupon the printing characteristic item display/selection process in S3710 is completed.

It is now assumed that the operator desires to adjust the color adjustment characteristic for the image type "photograph" from the default characteristic "normal" into an "enhanced type." In this case, the operator first clicks the item "photograph" in the box "B" in the initial setting display of FIG. 17(a), so that the display changes into that of FIG. 17(b). The layout screen box changes from that of FIG. 18(a) into that of FIG. 18(b). Then, the operator clicks the item "color adjustment" in the box C of FIG. 19(a). As a result, the box C is changed into the display state of FIG. 19(b). The operator further clicks the item "enhanced" before depressing the setting completion key. When the setting completion key is depressed, the process of S3710 is completed, and the program proceeds to S3730.

It is noted that each of the printing characteristic selection menu (box "C") is provided with an auto key Ca. When the auto key Ca is selected in S3710, the CPU 12 executes the same processes as those in S3300 to again set the default printing characteristic for the operator's selected image type. The auto key Ca is especially useful when the operator desires to change the printing characteristic, which the operator has set manually in S3700 in a previous routine of S3500–S3700, back to the initial characteristic.

This printing characteristic auto-setting process will be described below.

When the auto key Ca is selected, the CPU 12 first determines the operator's selected image type (image type presently displayed in the box "A"). A default printing characteristic suitable for the operator's selected image type is searched from the printing characteristic memory region M1 of FIG. 23. Then, the CPU 12 refers to the regional data stored in the printing characteristic setting region M3 of FIG. 24. and determines an image type of each image portion (partial image, composite image element, and image element). The CPU 12 then compares the operator's selected image type with the image type of each image portion. When the image type of a certain image portion is the same as or included in the selected image type, printing characteristic set for that image portion is changed back to the default printing characteristic. When the operator clicks the setting completion key, the process of S3710 is completed.

When the process in S3710 is thus completed, the program proceeds to S3730. In S3730, the CPU 12 first stores the operator's selected image type data and the operator's selected printing characteristic data in the working memory 14. In other words, the CPU 12 stores, in the working memory 14, data of the image type now displayed in the box "A" and data of the operator's selected printing characteristic item(s). Then, the CPU 12 searches image portions, whose image types are the same as or included in the operator's selected image type, from the image type memory region M2 of FIG. 20. Then, the CPU 12 searches printing characteristic data for the searched image portions from the printing characteristic setting region M3 of FIG. 24. The CPU 12 then replaces the thus searched printing characteristic data with the printing characteristic data presently stored in the working memory 14. Thus, the default printing characteristics, set in the memory M3 for the operator's selected image type and for the image types of categories narrower than the operator's selected image type, are replaced with the operator's selected printing characteristic.

It is now assumed that the operator has selected image type "photograph/portrait", the operator has selected the image portion 52 for that image type, and the operator has selected "vivid/clear" color adjustment characteristic. In this case, the default color adjustment characteristics set for the image type "photograph/portrait" and for image types "photograph/portrait/. . . ", which are included in the image type "photograph/portrait" and which are narrower than the category of the "photograph/portrait", are replaced with the color adjustment characteristic "vivid/clear". Accordingly, the color adjustment characteristic "vivid/clear" is set for not only the partial image 52 but also for all the constituent image elements and composite image elements of the partial image 52.

After the process of S3730 is completed, the program returns to S3500. When the operator desires to further adjust printing characteristics (yes in S3500), the processes S3600–S3700 are repeatedly executed. If no more adjustment is needed (no in S3500). the processes of S3000 are completed.

Next, image data of the entire image 50 is converted in S4000 while referring to the printing characteristic setting data presently stored in the printing characteristic setting region M3 of FIG. 24.

Figure 8:
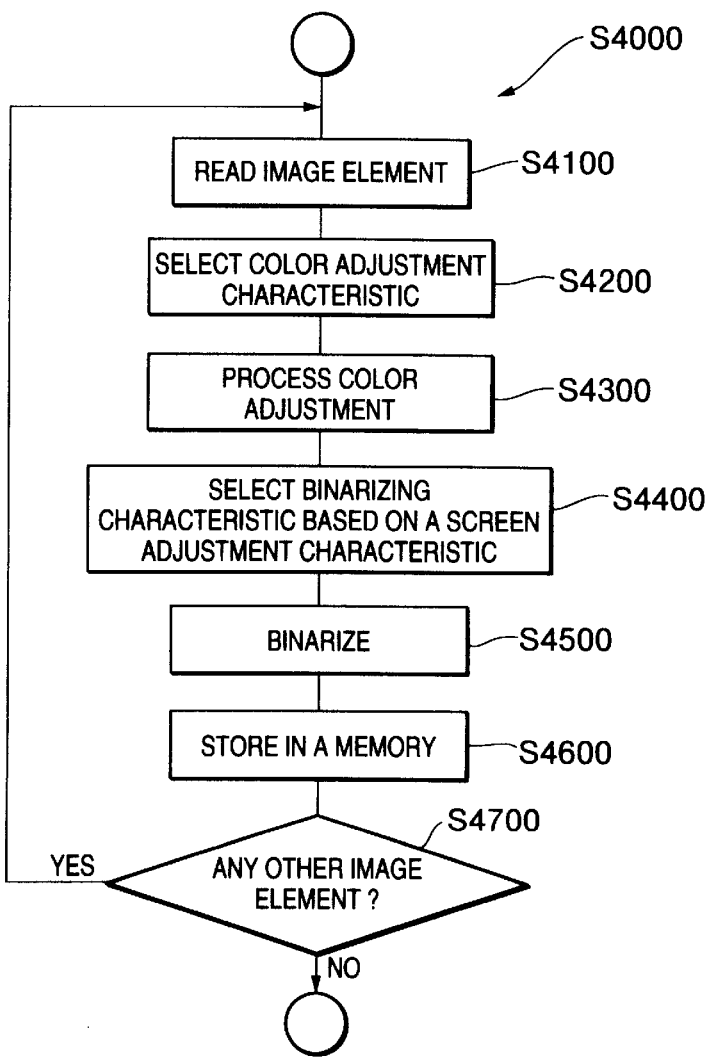
FIG. 8 is a flowchart of a process for converting image data according to the printing characteristic setting data.

Details of the processings in S4000 will be described below while referring to FIG. 8.

First, in S4100, image data of one image portion (one image element, one composite image element, or one partial image) is retrieved from the image memory 16. Based on the retrieved image data, a set of regional data indicative of a region of the retrieved image element or partial image is searched in the image type memory region M2 of FIG. 20.

Then, an image type of the retrieved image element or partial image is determined.

Then, the CPU 12 searches the printing characteristic setting data stored in the printing characteristic setting region M3 of FIG. 24 in correspondence with the determined image type. The CPU 12 retrieves in S4200 color adjustment characteristic data from the searched printing characteristic setting data. The CPU 12 further retrieves from the hard disk 20 a set of color adjustment data (one 3DLUT data file) corresponding to the retrieved color adjustment characteristic. Then, in S4300, color of the read out image data is adjusted in accordance with the retrieved color adjustment data. That is, color values in the image data are converted into color-adjusted color values with the use of the retrieved 3DLUT data file.

The CPU 12 further retrieves in S4400 screen adjustment characteristic data from the searched printing characteristic setting data. The CPU 12 further retrieves from the hard disk 20 a set of screen data (binarization data) corresponding to the retrieved screen adjustment characteristic. Then, in S4500, the image data, whose color has been adjusted in S4300, is subjected to a binarization process in accordance with the retrieved binarization data. Then, the resultant image data is stored in the working memory 14 in S4600.

In S4700, it is judged whether or not any image portions (any image elements, any composite image elements, or any partial images) remain unprocessed. If so (yes in S4700), the program returns to S4100. The remaining image portions are processed into color-adjusted binary data. When all the image portions are processed into color-adjusted binary data, (no in S4700), the processes in S4000 are completed.

The image data thus processed and stored in the working memory 14 is transferred in S5000 to the ink jet color dot printer 24 to be printed thereby. It is noted that, image data for each image portion has been processed in S4000 with corresponding printing characteristics. Accordingly, each image portion can be printed into the operator's desired appearance.

As described above, according to the present embodiment, before printing, the CPU 12 prescans image data stored in the working memory 14 to determine a location and an image type of each image portion in S3100. The CPU 12 creates image type data for all the image portions (partial images and their constituent image elements), and stores the image type data in the working memory 14. Image type data represent regions of the image portions, a hierarchical relationship between the respective image portions, and image types of the image portions. After manipulating the mouse input device to change a printing characteristic in S3500, the operator selects, in accordance with the hierarchical structure. an image type whose printing characteristic is desired to be changed in S3600. One or more image portions of the selected image type are displayed on an image layout screen. Image data for the displayed image portions is searched from the image type data. The operator selects and designates a printing characteristic desired to be set for the displayed image portions. As a result, in 63700, the operator's designated printing characteristic is set as a common characteristic onto image data of the displayed image portions.

According to the printing characteristic setting device 2, all the image types are categorized in the hierarchical structure. The operator can select his/her desired image type by following the hierarchical steps, thereby easily selecting his/her desired image type.

Image portions, with their image types being included in the operator s selected image type, are automatically displayed in the layout mode in S3620. Accordingly, the operator can easily recognize image portions whose printing characteristic is desired to be changed.

In the printing characteristic adjusting/storing process of S3700, the operator's selected printing characteristics are set for ail of the displayed image regions as common printing characteristics. The operator can therefore efficiently set the printing characteristics appropriate for his/her selected image type.

During the printing characteristic setting process (S3300), the default printing characteristic is automatically set for each image portion according to its image type. The operator can refer to the default characteristic data when he/she sets his/her desired printing characteristic. When the operator is satisfied with the default printing characteristic, no more adjustment is necessary, whereby operability is enhanced.

During the image element omitting/adding process of S3640, the operator's desired image portion is omitted from and/or added to image portions presently displayed in the image layout mode of S3620 based on the operator's instruction, that is, a click signal inputted from the mouse input device 34. If the displayed image is determined as fails to include certain image portions which should be a part of the displayed image, the operator can add the image portions to the presently-displayed image portions. Similarly, if the displayed image is determined as includes certain image portions which should not be a part of the displayed image, the operator can omit the image portions. This prevents the operator from setting any undesired printing characteristics to any image portions. Any undisplayed image portions, which are ought to be displayed, can be added to the presently-displayed image. Therefore, efficiency is further improved.

The image element omitting/adding process of S3640 serves to adjust the image types of the omitted image portions and the added image portions. The image type of the omitted image portion is changed from the operator's selected image type (image type presently shown in the box "A") into an image type of a broader category. On the other hand, an image type of the added image portion is changed into the operator's selected image type (image type presently shown in the box "A". In this way, the orlginally-set image types of the image portions can be changed into different image types, and appropriate printing characteristics are automatically set for the newly-determined image types. This also improves efficiency.

Further, the plurality of sets of image data, which are classified by their image types and their corresponding printing characteristics, are arranged in a hierarchical structure and stored in the image type memory region M2 of FIG. 20.

Figure 19:
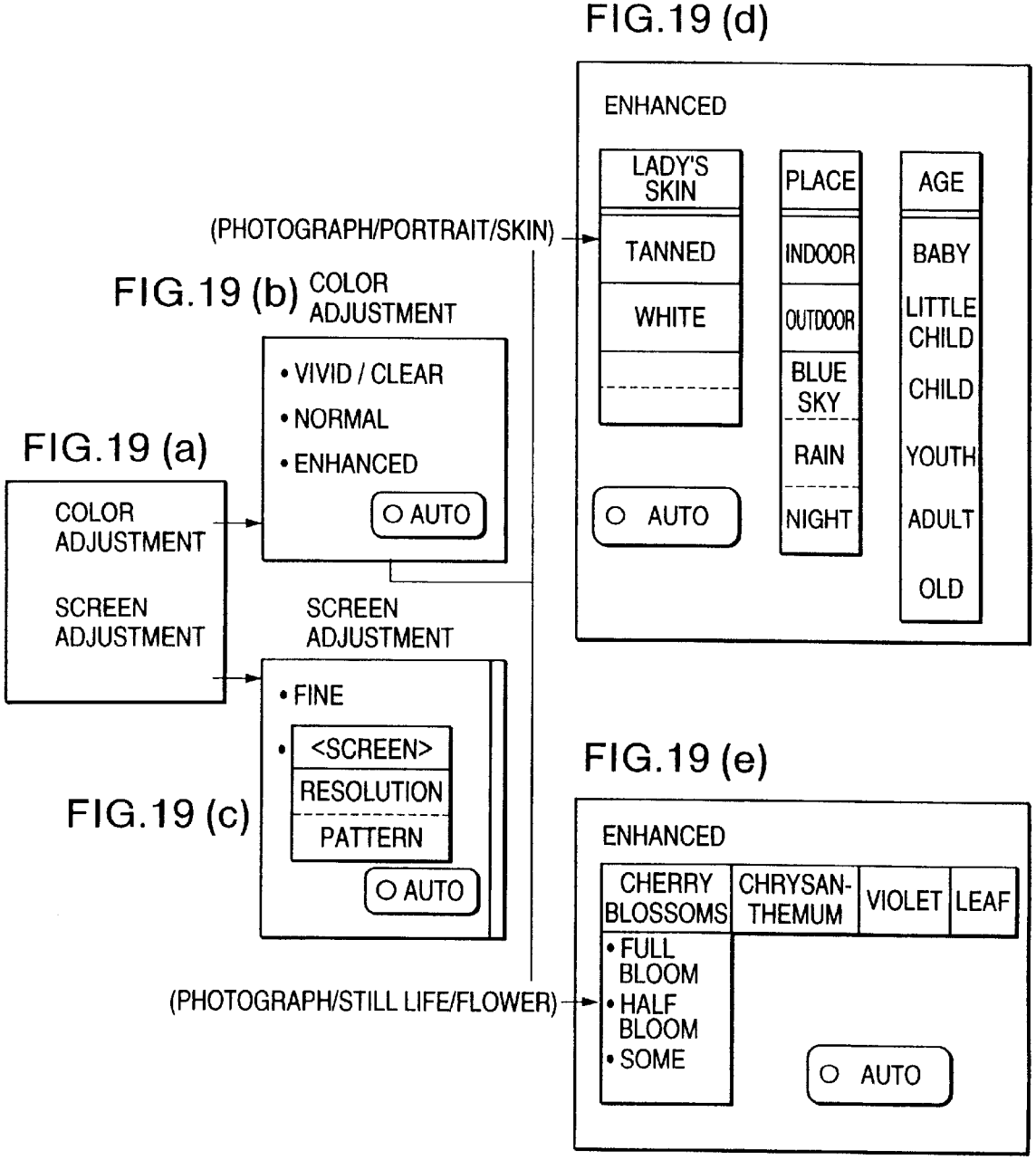

During the printing characteristic item display/selection process of S3710, print characteristic output menus of FIG. 19 are displayed based on the printing characteristic item data in accordance with the operator's selected image type. The read out menus are displayed in S3700 as menus for setting the printing characteristic common to the selected image type.

Therefore, the operator's desired printing characteristic is set for all of image portions of the operator's selected image type simply by selecting his/her desired printing characteristic from the printing characteristic setting menu. Therefore, the printing characteristic setting process can be executed efficiently.

During the image layout display process of S3620, the CRT display 22 displays image data stored in the working memory 14. The CRT display 22 displays image data on the display such that an image portion corresponding to the operator's selected image type can be discriminated from other image portions of non-selected image types. In this way, the image portions of the operator's selected image type is clearly shown on the screen, thereby enabling simplification of the printing characteristic setting operation. Also, an image portion desired to be omitted/added is easily selected from the screen.

While the invention has been described in detail with reference to the specific embodiment thereof, it would be apparent to those skilled in the art that various changes and modifications may be made therein without departing from the spirit of the invention.

As described above, according to the image output characteristic setting device of the present invention, when instructed by an operator, the operator selects, according to the hierarchical structure, an image type whose image output characteristic is desired to be changed from the default image output characteristic. As a result, at least one image portion (image element, composite image element, or partial image) of the selected image type is automatically selected or extracted from the entire image. The operator's desired image output characteristic is set as an image output characteristic common to all the thus selected at least one image portion.

The operator can easily select his/her desired image type from the plurality of image types because the plurality of image types are already classified in the hierarchical structure. The at least one image portion of the operator's selected image type is automatically selected or extracted from the image data memory. Accordingly, the operability is greatly enhanced.

The operator's designated image output characteristic is set common to all the selected at least one image portion. Accordingly, image output characteristics are set all at once for all the selected at least one image portion. Accordingly, the characteristic setting operation can be performed highly efficiently.

The default value of the image output characteristic is initially set to each of all the image portions (partial images and their constituent image elements and composite image elements) in correspondence with an image type of each image portion. The operator can refer to the default values when designating his/her desired image output characteristics. Especially when the default value is satisfactory for the operator, the operator need not further designate his/her desired characteristic.

The operator may possibly consider that an image type of a certain image portion, located within the selected at least one image portion, should not be equal to or included in the operator's selected image type. In this case, the operator may omit the certain image portion from the selected at least one image portion. It is therefore possible to prevent the operator's undesired image output characteristic from being set to any image portions. The image type of the omitted image portion can be changed into another image type, which is located in the hierarchical structure in a broader category (upper rank ) than the category to which the operator's selected image type belongs. Alternatively, the image type of the omitted image portion can be set to an image type of still another category which is narrower than the broad category but which is different from the category to which the operator's selected image type belongs. In other words, the image type can be Set to an image type which is different from the operator's selected image type but which is located at the same rank with the operator's selected image type. Thus, the operator can freely set his/her desired image type to the omitted image portion.

The operator may possibly consider that an image type of a certain image portion, not included in the selected at least one image portion, should be equal to or included in the operator's selected image type. In this case, the operator may add the certain image portion to the selected at least one image portion. The operability is further enhanced. In this case, the image type of the added image portion will be set to the operator's selected image type.

The image output characteristic desired to be set for the selected image type is commonly set for the selected at least one image portion when the operator simply selects his/her desired image output characteristic from the menu screen, Which displays a plurality of image output characteristics for the plurality of image types.

On the display, the selected at least one image portion is displayed in a discrtminatable manner from the non-selected image portions. The operator can therefore easily grasp which image portion belongs to the operator's selected image type. The operator can easily designate an image portion desired to be omitted from or added to the operator's selected image type.

In the above description, the plurality of image types are stored as classified in the hierarchical structure. However, the plurality of image types may be stored not in the hierarchical structure, but may be stored in such a memory that can manage data stored therein according to a hierarchical structure.

In the above description, for the "text" image region, an image type is determined for each constituent letter, and stored in the memory region M2. However, the image type may be set for each block in the text where each block is defined by more than one letters of the same image type arranged adjacent to one another.

In the above description, the operator's selection of the image type and the image portion, whose printing characteristic is desired to be adjusted, is finally determined when the operator selects the printing characteristic adjusting mode in S3630. However, this selection may be determined when the operator inputs the setting completion key in S3710.

In the above description, the operator's selected printing characteristic is set not only for the operator's selected image type but also for image types which are included in the operator's selected image type and which are narrower than the category of the operator's selected image type. However, the operator's selected printing characteristic may be set only for the operator's selected image type.

In addition, the above-described device can set printing characteristic, with which image data of each image portion is processed into such data that can be printed by the printer 24 into the operator's desired appearance. However, display characteristic can be set in the same manner as described above. With the display characteristic, image data of each image portion can be processed into such data that can be displayed by the display 22 into the operator's desired appearance. The present invention therefore can be applied to setting of various image output characteristics, with which image data of each image portion can be processed into such data that can be outputted by various image output devices into the operator's desired appearance.

What is claimed is:

1. An image output characteristic setting device for setting an image output characteristic, the device comprising:

image data storage means for storing a set of entire image data indicative of an entire image, the entire image including at least one image portion, the set of entire image data including at least one set of image data indicative of the at least one image portion;

image type determining means for determining an image type of each image portion according to a hierarchical structure, in which the image type of each image portion is classified into photographs, graphics, text, or other image types of narrower categories than the categories of the image types of photogaphs, graphics and text;

image type data storage means for storing data of the image type that is determined for each set of image data as classified in the hierarchical structure;

image type selection means for enabling an operator to select, from the hierarchical structure, an image type, for which the operator desires to set his/her desired image output characteristic;

image data selecting means for selecting, from the image data storage means, at least one set of image data indicative of all of at least one image portion that belongs to the selected image type; and common image output characteristic setting means for enabling the operator to input his/her desired image output characteristic and for setting the operator's inputted image output characteristic as a common image output characteristic to all the selected at least one set of image data.

2. An image output characteristic setting device as claimed in claim 1, further comprising:

image output characteristic data storage means for previously storing data of a plurality of predetermined default image output characteristics in correspondence with a plurality of image types;

image output characteristic initial setting means for initially setting a default image output characteristic to each set of image data in accordance with the image type determined for the each set of image data, wherein the common image output characteristic setting means includes image output characteristic changing means for changing, for all of the selected at least one set of image data, the initially-set default image output characteristic into the operator's inputted image output characteristic; and output means for processing the entire image data through processing all the selected at least one set of image data with the operator's inputted image output characteristic to output the processed at least one image portion and processing all the non-selected sets of image data with the initially-set default image output characteristic to output the processed non-selected image portion.

3. An image output characteristic setting device as claimed in claim 1, further comprising image data omitting means for enabling the operator to designate an image portion desired to be omitted from the at least one set of image data that is selected as belonging to the operator's selected image type, and for omitting a set of image data of the designated image portion from the selected at least one set of image data.

4. An image output characteristic setting device as claimed in claim 3, further comprising image type changing means for changing the image type of the omitted set of image data into an image type of a broader category than a category to which belongs the selected image type.

5. An image output characteristic setting device as claimed in claim 1, further comprising image data adding means for enabling the operator to designate an image portion that is not selected by the image data selecting means and that is desired to be added to the selected at least one set of image data, and for adding, to the selected at least one set of image data, a set of image data for the designated image portion.

6. An image output characteristic setting device as claimed in claim 5, further comprising another image type changing means for changing the image type of the added set of image data into the operator's selected image type.

7. An image output characteristic setting device as claimed in claim 1, wherein the common image output characteristic setting means includes:

image output characteristic menu storage means for previously storing data of at least one image output characteristic menu indicative of at least one image output characteristic capable of being set for each image type; and menu retrieving means for retrieving data of one image output characteristic menu in correspondence with the operator's selected image type to display a menu screen for allowing the operator to select his/her desired image output characteristic to be set as the common image output characteristic.

8. An image output characteristic setting device as claimed in claim 1, further comprising:

a display capable of displaying various images; and display control means for controlling the display to display the image data stored in the image data storage means in a manner that the set of image data selected by the image data selecting means as belonging to the operator's selected image type is discriminatable from the non-selected set of image data.

9. An image output characteristic setting device as claimed in claim 2, wherein the output means includes printing means capable of printing the image data stored in the image data storage means, wherein each of the plurality of predetermined default image output characteristics includes a predetermined default image printing characteristic, the image output characteristic initial setting means initially setting a default image printing characteristic to each set of image data in accordance with the determined image type, the common image output characteristic setting means enabling the operator to input his/her desired image printing characteristic and setting the operator's inputted image printing characteristic to all the selected sets of image data, the printing means processing all the selected at least one set of image data with the operator's inputted image printing characteristic to print the processed at least one selected image portion and processing all the non-selected sets of image data with the initially-set default image printing characteristic to print the processed non-selected image portion.

10. An image output characteristic setting device as claimed in claim 2, wherein the output means includes display means capable of displaying the image data stored in the image data storage means, wherein each of the plurality of predetermined default image output characteristics includes a predetermined default image displaying characteristic, the image output characteristic initial setting means initially setting the default image displaying characteristic to each set of image data in accordance with the determined image type, the common image output characteristic setting means enabling the operator to input his/her desired image displaying characteristic and setting the operator's inputted image displaying characteristic to all the selected sets of image data, the displaying means processing all the selected at least one set of image data with the operator's inputted image displaying characteristic to display the processed at least one image portion and processing all the non-selected sets of partial image data with the initially-set default image displaying characteristic to display the processed non-selected image portion.

11. An image output characteristic setting device as claimed in claim 1, further comprising:

input means enabling the operator to input his/her instruction, wherein the image type selection means includes control means for controlling the input means to allow the operator to input his/her desired image type, and for controlling in response to the inputted desired image type, the image data selecting means to automatically select the at least one image data set that belongs to the operator's selected image type.

12. An image output characteristic setting device as claimed in claim 11, wherein the common image output characteristic setting means includes another control means for controlling the input means to allow the operator to set his/her desired image output characteristic for his/her selected image type, and for, in response to the set image output characteristic automatically setting the desired image output characteristic to all the selected at least one set of image data.

13. An image output characteristic setting device as claimed in claim 12, wherein the input means allows the operator to further input an instruction to omit a desired image portion from the at least one image portion selected as belonging to the operator's selected image type, further comprising:

image data omitting means for automatically omitting a set of image data of the desired image portion from the selected at least one set of image data; and image type changing means for automatically changing the image type of the omitted set of image data into an image type of a broader category than a category to which belongs the selected image type.

14. An image output characteristic setting device as claimed in claim 12, wherein the input means allows the operator to further input an instruction to add a desired image portion to the at least one image portion selected as belonging to the operator's selected image type, further comprising:

image data adding means for automatically adding, to the selected at least one set of image data, another set of image data indicative of the desired image portion which is not selected by the image data selecting means; and another image type changing means for automatically changing the image type of the added set of image data into the operator's desired image type.

15. An image output characteristic setting device as claimed in claim 1, wherein the image data selecting means selects all the at least one set of image data whose image type is either of the same category with the operator's selected image type or of a narrower category than the operator's selected image type.

16. An image output characteristic setting device as claimed in claim 1, further comprising image data combining means for combining at least one set of partial image data, indicative of at least one partial image, into the set of entire composite image data that indicates the entire composite image, each of the at least one partial image being of a corresponding image type that is either one of photographs, graphics or text, wherein the image type determining means includes image programming means for prescanning the entire composite image data, to thereby determine an image type of each image portion that constitutes the entire composite image, according to the hierarchical structure, wherein the image type is classified into photographs, graphics, text, or other image types of narrower categories than the categories of the image types of photographs, graphics and text.

17. An image output characteristic setting device as claimed in claim 2, further comprising:

input means enabling the operator to input his/her instructions;

image type determination control means for controlling the image type determining means to determine the image type of each image portion, in response to input of the operator's instruction to output the entire image;

image type selection control means for controlling the image type selection means to allow the operator to select his/her desired image type, in response to input of the operator's instruction to change the default image output characteristic; and characteristic setting control means for, in response to input of the operator's instruction indicative of a desire to input the operator's desired image output characteristic, controlling the common image output characteristic setting means to enable the operator to input his/her desired image output characteristic and to set the operator's inputted image output characteristic to the selected at least one set of image data.

18. An image output characteristic setting device as claimed in claim 17, further comprising a display device capable of displaying various images, wherein the image type selection means controls the display device to display an image type name listing portion for displaying a name of an image type and an image layout screen portion for displaying images, wherein the input means enables the operator to designate a category shift mode to designate his/her desired image type on the image type name listing portion, the image type selection means controlling, during the category shift mode, the display device to successively change the name of the image type listed on the image type name listing portion, according to the hierarchical structure, and to display, on the image layout screen, at least one image portion that belongs to an image type whose name is presently being listed on the image type name listing portion, thereby allowing the operator to designate his/her desired image type, wherein the common image output characteristic setting means controls the display device to display an output characteristic item listing portion indicative of an output characteristic item data to be selected, and wherein the input means enables the operator to designate an output characteristic adjusting mode to designate his/her desired image output characteristic onto an image type that is presently being listed on the image type name listing portion and whose corresponding at least one image portion is presently being displayed on the image layout screen, the common image output characteristic setting means controlling, during the output characteristic adjusting mode, the display device to successively change an output characteristic menu on the output characteristic item listing portion, thereby allowing the operator to designate his/her desired image output characteristic.

19. An image output characteristic setting device as claimed in claim 9, wherein the predetermined default image printing characteristic includes a predetermined default color adjustment characteristic, the image output characteristic initial setting means initially setting the default color adjustment characteristic to each set of image data in accordance with the determined image type, the common image output characteristic setting means enabling the operator to input his/her desired color adjustment characteristic and setting the operator's inputted color adjustment characteristic as the common image output characteristic to all the selected sets of image data, the printing means adjusting color of all the selected at least one set of image data with the operator's inputted color adjustment characteristic to print the color-adjusted at least one selected image portion and adjusting color of all the non-selected sets of image data with the initially-set default color adjustment characteristic to print the color-adjusted non-selected image portion.

20. An image output characteristic setting device as claimed in claim 9, wherein the predetermined default image printing characteristic includes a predetermined default screen adjustment characteristic, the image output characteristic initial setting means initially setting the default screen adjustment characteristic to each set of image data in accordance with the determined image type, the common image output characteristic setting means enabling the operator to input his/her desired screen adjustment characteristic and setting the operator's inputted screen adjustment characteristic as the common image output characteristic to all the selected sets of image data, the printing means binarizing all the selected at least one set of image data with the operator's inputted screen adjustment characteristic to print the binarized at least one selected image portion and binarizing all the non-selected sets of image data with the initially-set default screen adjustment characteristic to print the binarized non-selected image portion.

21. A device for setting printing characteristic to a composite image, the device comprising:

input means for inputting an operator's instruction;

image data combining means for combining at least one set of partial image data, indicative of at least one partial image, into a set of composite image data that indicates an entire composite image, each of the at least one partial image being of a corresponding image type that is either one of photographs, graphics, or text;

image data storage means for storing the set of composite image data;

print determining means for determining whether the operator's instruction to print the entire composite image is inputted;

image prescanning means for, in response to input of the operator's instruction to print the entire composite image, automatically prescanning the composite image data to determine image types of a plurality of image portions that constitute the entire composite image, according to a hierarchical structure, wherein the image types are defined as photographs, graphics, text, or other image types of narrower categories than the categories of the image types of photographs, graphics and text;

image type data storage means for storing data of the image type that is determined for each image portion as classified in the hierarchical structure;

image printing characteristic initial setting means for initially setting a default image printing characteristic to each image portion in accordance with the determined image type;

characteristic change determining means for determining whether the operator's instruction to change the default image printing characteristic is inputted;

image type selection means for, in response to input of the operator's instruction to change the default image printing characteristic, enabling the operator to select, from the hierarchical structure, an image type whose image printing characteristic is desired to be changed from the corresponding default image printing characteristic to the operator's desired image printing characteristic;

image data selecting means for automatically selecting, from the image data storage means, all of one or more image portions that belongs to the operator's selected image type;

common image printing characteristic setting means for enabling the operator to input his/her desired image printing characteristic and for automatically setting the inputted image printing characteristic as a common image printing characteristic to all of the selected one or more image portion;

output means for processing the entire composite image through processing image data for all the selected one or more image portion with the operator's inputted image printing characteristic and processing image data of all the non-selected image portions with the initially-set default image printing characteristic; and display means capable of displaying images and messages, wherein the image type selection means includes control means for controlling the input means to allow the operator to input his/her designation of a category shift mode, the control means controlling, during the category shift mode, the display means to successively display names of the image types according to the hierarchical structure while successively displaying one or more image portions that belong to an image type whose name is presently being displayed, and wherein the common image printing characteristic setting means includes another control means for controlling the input means to allow the operator to input his/her designation of a print characteristic adjusting mode, the other control means controlling, during the print characteristic adjusting mode, to display data of image printing characteristics capable of being selected by the operator for the image type whose name is presently being displayed on the display means.

22. A method of setting a printing characteristic to a composite image, the method comprising the steps of:

combining at least one set of partial image data, indicative of at least one partial image, into a set of composite image data that indicates an entire composite image, each of the at least one partial image being of a corresponding image type that is either one of photographs, graphics, or text;

storing the set of composite image data, determining whether the operator's instruction to print the entire composite image is inputted;

prescanning the composite image data, in response to input of the operator's instruction to print the entire composite image, to determine image types of a plurality of image portions that constitute the entire composite image, according to a hierarchical structure, wherein the image types are defined as photographs, graphics, text, or other image types of narrower categories than the categories of the image types of photographs, graphics and text;

storing data of the image type that is determined for each image portion as classified in the hierarchical structure;

initially setting a default image printing characteristic to each image portion in accordance with the determined image type;

determining whether the operator's instruction to change the default image printing characteristic is inputted;

enabling, in response to input of the operator's instruction to change the default image printing characteristic, the operator to select, from the hierarchical structure, an image type whose image printing characteristic is desired to be changed from the corresponding default image printing characteristic to the operator's desired image printing characteristic;

selecting, from the entire composite image data, all of one or more image portions that belongs to the operator's selected image type;

enabling the operator to input his/her desired image printing characteristic and setting the inputted image printing characteristic as a common image printing characteristic to all of the selected one or more image portions; and processing the entire composite image through processing image data for all the selected one or more image portions with the operator's inputted image printing characteristic and processing image data of all the non-selected image portions with the initially-set default image printing characteristic, wherein the image type selection step includes the step of allowing the operator to input his/her designation of a category shift mode and controlling, during the category shift mode, a display to successively display names of the image types according to the hierarchical structure while successively displaying one or more image portions that belong to an image type whose name is presently being displayed, and wherein the common image printing characteristic setting step includes the step of allowing the operator to input his/her designation of a print characteristic adjusting mode and controlling the display, during the print characteristic adjusting mode, to display data of image printing characteristics capable of being selected by the operator for the image type whose name is presently being displayed on the display means.

* * * * *